United States Patent
Yoo et al.

(10) Patent No.: US 10,656,958 B2
(45) Date of Patent: May 19, 2020

(54) METHOD AND APPARATUS FOR CONTROLLING VIRTUAL SWITCHING

(71) Applicant: SAMSUNG ELECTRONICS CO., LTD., Suwon-si, Gyeonggi-do (KR)

(72) Inventors: Jae-yong Yoo, Yongin-si (KR); Sang-dok Mo, Hwaseong-si (KR); Jae-min Kim, Pyeongtaek-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 517 days.

(21) Appl. No.: 14/568,246

(22) Filed: Dec. 12, 2014

(65) Prior Publication Data

US 2015/0172182 A1 Jun. 18, 2015

(30) Foreign Application Priority Data

Dec. 18, 2013 (KR) .................. 10-2013-0158677

(51) Int. Cl.
*G06F 9/455* (2018.01)
*H04L 12/931* (2013.01)

(52) U.S. Cl.
CPC .......... *G06F 9/45533* (2013.01); *H04L 49/70* (2013.01); *H04L 49/00* (2013.01)

(58) Field of Classification Search
None
See application file for complete search history.

(56) References Cited

U.S. PATENT DOCUMENTS

| | | | |
|---|---|---|---|
| 8,265,075 B2 | 9/2012 | Pandey | |
| 2004/0179546 A1* | 9/2004 | McDaniel | H04L 43/028 370/463 |
| 2006/0168013 A1* | 7/2006 | Wilson | G05B 19/4184 709/206 |
| 2007/0127443 A1* | 6/2007 | Spencer | H04M 7/0018 370/352 |
| 2008/0183901 A1* | 7/2008 | Cardona | H04L 69/16 709/250 |
| 2009/0034519 A1* | 2/2009 | Kashyap | H04L 29/06 370/389 |
| 2009/0089351 A1* | 4/2009 | Belgaied | H04L 49/90 709/201 |
| 2010/0128681 A1* | 5/2010 | Breuer | H04W 28/16 370/329 |
| 2010/0232443 A1 | 9/2010 | Pandey | |

(Continued)

FOREIGN PATENT DOCUMENTS

WO 2012-039792 A1 3/2012

OTHER PUBLICATIONS

International Search Report dated Feb. 24, 2015 in corresponding International Patent Application PCT/KR2014/012256.

*Primary Examiner* — Jeffrey M Rutkowski
*Assistant Examiner* — Ning Li
(74) *Attorney, Agent, or Firm* — Staas & Halsey LLP

(57) ABSTRACT

Provided is a method of controlling virtual switching, the method including: receiving at least one command from an external apparatus; determining whether the at least one command is performable by a network interface apparatus for controlling virtual switching; and based on a result of the determining, controlling the network interface apparatus or at least one operating system for driving an application to perform virtual switching.

15 Claims, 14 Drawing Sheets

(56) References Cited

U.S. PATENT DOCUMENTS

| | | | |
|---|---|---|---|
| 2011/0103259 A1* | 5/2011 | Aybay | H04L 49/35 |
| | | | 370/254 |
| 2011/0320632 A1 | 12/2011 | Karino | |
| 2012/0042054 A1 | 2/2012 | Kotha et al. | |
| 2012/0079478 A1 | 3/2012 | Galles et al. | |
| 2012/0137288 A1 | 5/2012 | Barrett et al. | |
| 2012/0284712 A1 | 11/2012 | Nimmagadda et al. | |
| 2012/0291025 A1 | 11/2012 | Kidambi et al. | |
| 2012/0324442 A1* | 12/2012 | Barde | H04L 49/70 |
| | | | 718/1 |
| 2013/0003678 A1* | 1/2013 | Quan | H04W 72/04 |
| | | | 370/329 |
| 2013/0044631 A1 | 2/2013 | Biswas et al. | |
| 2013/0080567 A1* | 3/2013 | Pope | G06F 13/385 |
| | | | 709/213 |
| 2013/0318255 A1* | 11/2013 | Karino | H04L 12/44 |
| | | | 709/238 |
| 2015/0009995 A1* | 1/2015 | Gross, IV | H04L 45/74 |
| | | | 370/392 |
| 2015/0052280 A1* | 2/2015 | Lawson | G06F 13/28 |
| | | | 710/308 |
| 2015/0319250 A1* | 11/2015 | Vasudevan | H04L 29/08 |
| | | | 709/228 |
| 2016/0036732 A1* | 2/2016 | Lu | H04L 69/161 |
| | | | 370/235 |
| 2017/0185549 A1* | 6/2017 | Pope | G06F 13/385 |

\* cited by examiner

METHOD AND APPARATUS FOR CONTROLLING VIRTUAL SWITCHING

CROSS-REFERENCE TO RELATED APPLICATIONS

This application claims the benefit of Korean Patent Application No. 10-2013-0158677, filed on Dec. 18, 2013, in the Korean Intellectual Property Office, the disclosure of which is incorporated herein in its entirety by reference.

BACKGROUND

1. Field

One or more exemplary embodiments relate to a method of performing virtual switching, and more particularly, to a method and apparatus for processing, using a server, a packet via virtual switching.

2. Description of the Related Art

Types of client apparatuses that are used are diversifying, and the number of electronic devices owned per person is increasing. Since users use various content by using various client apparatuses, a data amount that needs to be processed by a server is increasing tremendously.

Thus, in order to process data required by many client apparatuses, the size of a server is gradually increasing. In detail, a server virtualization technology that installs several virtual machines each including an operating system on one physical server and operates the physical server as several servers has been developed.

Examples of a method of controlling, by using a plurality of virtualized servers, data include a method of controlling data via software, such as a software-defined network method, and a method of controlling data by controlling a hardware apparatus, such as a single root input/output (IO) virtualization (SR-IOV) method.

Here, IO high speed technology that controls a hardware apparatus, such as a network interface apparatus, has a high speed but lacks scalability and flexibility, and a service digital network (SDN) method that controls a server via software has a low speed, and thus a method of controlling, using a server, data, which has a high speed and flexibility, is required.

SUMMARY

One or more exemplary embodiments include a method and apparatus for processing, using a server, a packet via virtual switching.

Additional aspects will be set forth in part in the description which follows and, in part, will be apparent from the description, or may be learned by practice of the presented exemplary embodiments.

According to one or more exemplary embodiments, a method of controlling virtual switching, the method includes: receiving at least one command from an external apparatus; determining whether the at least one command is performable by a network interface apparatus for controlling virtual switching; and based on a result of the determining, controlling the network interface apparatus or at least one operating system for driving an application to perform virtual switching.

The at least one command received from the external device may include: a first command performable by the network interface apparatus; and a second command performable by the at least one operating system.

The second command may be a command obtained by excluding the first command from the at least one command received from the external apparatus.

The controlling may include: controlling the network interface apparatus to perform virtual switching based on the first command; and controlling the at least one operating system to perform virtual switching based on the second command.

The determining may include converting a command performable by the network interface apparatus to a command format compatible with the network interface apparatus.

The determining may include analyzing a category of a command performable by the network interface apparatus, and the controlling may include inputting the command to a table in the network interface apparatus, which corresponds to the category, based on a result of the analyzing.

The at least one command may include a command related to at least one of switching, tagging, untagging, editing, filtering, and rate limiting.

The controlling may include, if the at least one command does not include a command performable by the network interface apparatus, controlling the at least one operating system to perform virtual switching.

The at least one operating system may include a software switch unit, the network interface apparatus may include a hardware switch unit, and the controlling may include controlling the software switch unit and the hardware switch unit to perform virtual switching.

The determining may include: receiving capability information about the capability of the network interface apparatus, from the network interface apparatus; and determining whether the at least one command received from the external apparatus is performable by the network interface apparatus based on the capability information.

The receiving of the capability information may include: converting the capability information to a format of a capability information matrix; and converting the at least one command received from the external apparatus to a format of a capability vector, wherein the determining based on the capability information may include determining whether the at least one command received from the external apparatus is performable by the network interface apparatus based on the converted capability information and the converted at least one command.

The method may further include requesting the external apparatus for the at least one command, wherein the requesting may include not requesting the external apparatus for the at least one command when the number of times the at least one command is requested is equal to or higher than a certain number of times.

The controlling may include: controlling the network interface apparatus to process a received packet based on the first command; controlling the network interface apparatus to transmit the processed packet to the at least one operating system; and controlling the at least one operating system to process the processed packet based on the second command.

The controlling may include: controlling a hypervisor to transmit a received packet to the at least one operating system; and controlling the at least one operating system to process the received packet from the hypervisor based on the at least one command received from the external apparatus.

The controlling may include controlling the network interface apparatus and the at last one operating system to process a packet transmitted to a client apparatus based on the at least one command received from the external apparatus.

According to one or more exemplary embodiments, a computer-readable recording medium has recorded thereon a program for executing the method above.

According to one or more exemplary embodiments, a server apparatus includes: at least one operating system for driving an application; a network interface apparatus for performing virtual switching; and a hypervisor for controlling access to the at least one operating system and the network interface apparatus, wherein the hypervisor determines whether at least one command received from an external apparatus is performable by the network interface apparatus and controls the network interface apparatus or the at least one operating system to perform virtual switching based on a result of the determination.

The at least one command received from the external apparatus may include: a first command performable by the network interface apparatus; and a second command performable by the at least one operating system.

The second command may be a command obtained by excluding the first command from the at least one command received from the external apparatus.

The hypervisor may control the network interface apparatus to perform virtual switching based on the first command and control the at least one operating system to perform virtual switching based on the second command.

The hypervisor may include a command converter that converts a command performable by the network interface apparatus to a command format compatible with the network interface apparatus, based on a result of the determination.

The hypervisor may analyze a category of a command performable by the network interface apparatus and input the command to a table in the network interface apparatus, which corresponds to the category, based on a result of the analysis.

The at least one command may include a command related to at least one of switching, tagging, untagging, editing, filtering, and rate limiting.

The hypervisor may control the at least one operating system to perform virtual switching when the at least one command does not include a command performable by the network interface apparatus.

The at least one operating system may include a software switch unit, the network interface apparatus may include a hardware switch unit, and the hypervisor may control the software switch unit and the hardware switch unit to perform virtual switching.

The hypervisor may include: a capability information obtainer that receives capability information about the capability of the network interface apparatus, from the network interface apparatus; and a command analyzer that determines whether the at least one command received from the external apparatus is performable by the network interface apparatus, based on the capability information.

The hypervisor may further include an information converter that converts the capability information to a format of a capability information matrix and the at least one command received from the external apparatus to a format of a capability vector, and the command analyzer may determine whether the at least one command received from the external apparatus is performable by the network interface apparatus based on the converted capability information and the converted at least one command.

The hypervisor may include a command requester that requests the external apparatus for the at least one command, wherein the command requester may not request the external apparatus for the at least one command when the number of times the at least one command is requested is equal to or higher than a certain number of times.

The network interface apparatus may process a received packet based on the first command and transmits the processed packet to the at least one operating system, and the at least one operating system may process the packet processed by the network interface apparatus based on the second command.

The hypervisor may transmit a received packet to the at least one operating system, and the at least one operating system may process the packet received from the hypervisor based on the at least one command received from the external apparatus.

The network interface apparatus and the at least one operating system may process a packet transmitted to a client apparatus based on the at least one command received from the external apparatus.

According to one or more exemplary embodiments, a server apparatus includes a network interface apparatus and a hypervisor to determine whether a command received from an external apparatus is performable by the network interface apparatus according to a capability of the network interface apparatus, wherein the hypervisor controls the network interface apparatus to process the command received from the external apparatus based on a result of the determination.

According to one or more exemplary embodiments, a hypervisor is configured to be installed within a virtual server that includes a network interface apparatus. The hypervisor includes an information obtainer to receive at least one command from an external apparatus, a capability information obtainer to obtain capability information about capabilities of the network interface apparatus, a command analyzer to analyze the at least one command received by the information obtainer and to determine whether a first command performable by the network interface apparatus is included in the at least one command based on the capability information obtained by the capability information obtainer and a command converter to convert the first command performable by the network interface apparatus, which is determined by the command analyzer from among the at least one command obtained by the information obtainer, to a command format compatible with the network interface apparatus.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
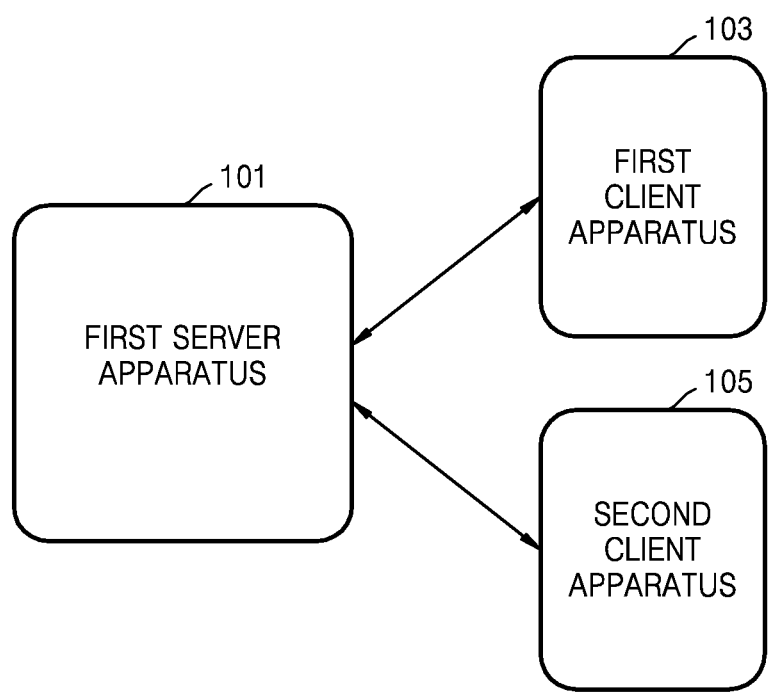
FIG. 1 is a diagram of a network according to an exemplary embodiment.

Hereinafter, the terms used in the specification will now be defined in view of the embodiments, which will now be described in detail.

All terms including descriptive or technical terms which are used herein should be construed as having meanings that are apparent to one of ordinary skill in the art. However, the terms may have different meanings according to an intention of one of ordinary skill in the art, precedent cases, or the appearance of new technologies. Also, some terms may be arbitrarily selected by the applicant, and in this case, the meaning of the selected terms will be described in detail here in the detailed description. Thus, the terms used herein have to be defined based on the meaning of the terms together with the description throughout the specification.

Also, when a part "includes" or "comprises" an element, unless there is a particular description contrary thereto, the part can further include other elements, not excluding the other elements. In the following description, terms such as "unit" and "module" indicate a unit for processing at least one function or operation, wherein the unit and the block may be embodied as hardware or software or embodied by a combination of hardware and software.

As used herein, the term "and/or" includes any and all combinations of one or more of the associated listed items.

Throughout the specification, at least one command received from an external apparatus may denote a command related to virtual switching. In other words, at least one command received by a server apparatus from an external apparatus may be included in packet control information, as information in which commands or rules, or both, required to process a packet are defined. Also, at least one command received by an external apparatus may include at least one command performable by a network interface apparatus and/or at least one operating system.

Also, in the present specification, when a component or a unit processes or performs a certain operation, a server apparatus may control the component or the unit to process or perform the certain operation.

Reference will now be made in detail to embodiments, examples of which are illustrated in the accompanying drawings. In this regard, the present embodiments may have different forms and should not be construed as being limited to the descriptions set forth herein. Descriptions about drawings that are not related to the one or more embodiments are omitted, and like reference numerals denote like elements.

FIG. 1 is a diagram of a network according to an exemplary embodiment.

As shown in FIG. 1, the network according to an exemplary embodiment may include a first server apparatus 101 and a plurality of client apparatuses, such as a first client apparatus 103 and a second client apparatus 105. The first client apparatus 103 and the second client apparatus 105 may be of the same type or of different types.

According to an exemplary embodiment, the first server apparatus 101 may be a virtual server. Alternatively, according to an exemplary embodiment, the first server apparatus 101 may be a physical server apparatus or a group of a plurality of server apparatuses, such as data centers.

The first and second client apparatuses 103 and 105 may be any one of various devices. For example, the first and second client apparatuses 103 and 105 may each be a desktop computer, a mobile phone, a smart phone, a laptop computer, a tablet personal computer (PC), an electronic book terminal, a digital broadcasting terminal, a personal digital assistant (PDA), a portable multimedia player (PMP), a navigation, an MP3 player, a digital camera, an internet protocol television (IPTV), a digital television (DTV), or a consumer electronics (CE) device (such as a refrigerator or air conditioner having a display device), but are not limited thereto, and may each be any device capable of communicating with a server.

According to an exemplary embodiment, the first server apparatus 101 and the first and second client apparatuses 103 and 105 may form a wireless network or a wired network. Types of network connection may include $3^{rd}$-generation (3G), 4G, LTE, and Wi-Fi, and a connection form is not limited thereto.

According to an exemplary embodiment, the first and second client apparatuses 103 and 105 may transmit or receive various types of data to or from the first server apparatus 101. For example, the first and second client apparatuses 103 and 105 may transmit or receive content streaming data, rendering data, control data, and authentication data, while a type of data is not limited thereto.

According to an exemplary embodiment, the first server apparatus 101 may transmit or receive data to or from the first and second client apparatuses 103 and 105. In other words, according to an exemplary embodiment, the first server apparatus 101 may transmit or receive various types of data to or from the first and second client apparatuses 103 and 105 in a packet form.

Figure 2:
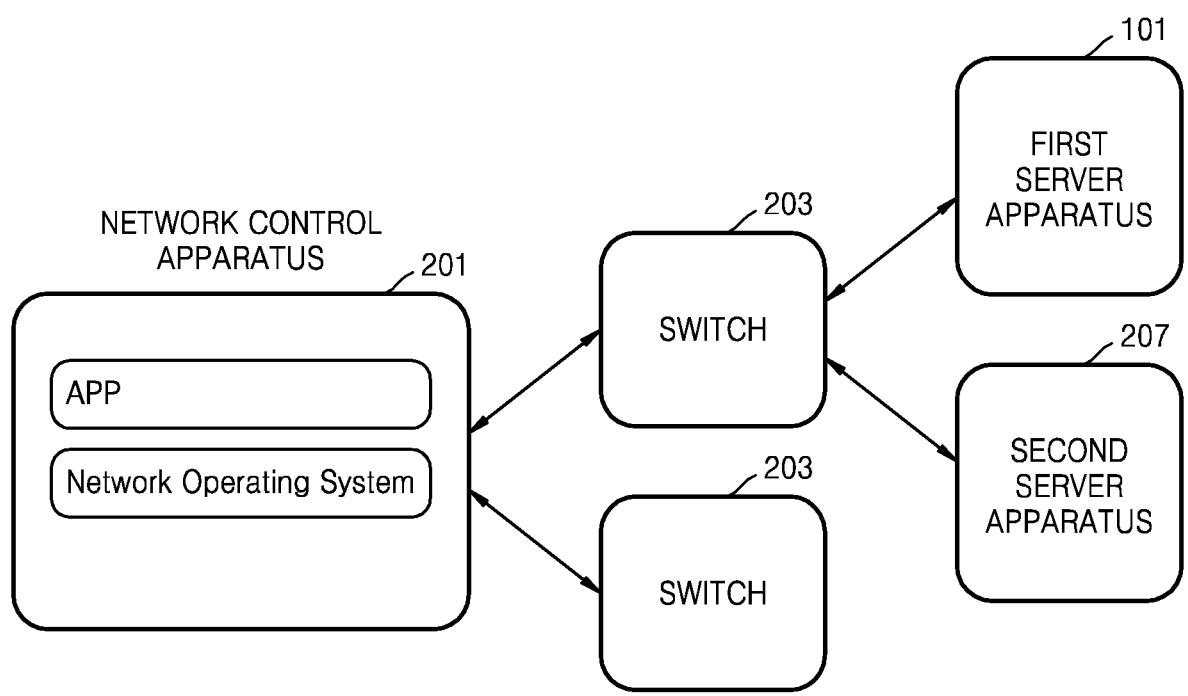
FIG. 2 is a diagram for describing a method of controlling a network, according to an exemplary embodiment.

FIG. 2 is a diagram for describing a method of controlling a network, according to an exemplary embodiment.

Recently, a virtual server obtained by virtualizing the first server apparatus 101 has been used to satisfy data processing requirements of client apparatuses. In detail, the virtual server may include at least one operating system (OS). Each OS may be used to operate one virtual machine, and one OS and one virtual machine may operate as one virtual server.

In a general server, a control capability of a switch unit that processes a packet is not separated from hardware in the general server. However, as a number of virtual servers increases, the number of switch units to be controlled by a user rapidly increases, and thus it becomes difficult for the user managing the general server to control the virtual servers one-by-one.

Accordingly, in order to manage a plurality of the virtual servers, the user uses a centralized management method by gathering, as one apparatus, control units for controlling the switch units that process packets in the virtual servers. Such a technology is referred to as a software-defined network (SDN) technology. Since the SDN technology is well known to one of ordinary skill in the art, details thereof are not provided here.

Referring to FIG. 2, according to an exemplary embodiment, the first server apparatus 101 and a second server apparatus 207 connecting the network control apparatus 201 and the first and second server apparatuses 101 and 207 may include hardware for performing a packet process, such as packet forwarding. The network control apparatus 201 may control the switch 203 via an interface.

According to an exemplary embodiment, the network control apparatus 201 may provide an application programming interface (API), and a user may control a network OS by using the API provided by the network control apparatus 201 via an application.

According to an exemplary embodiment, the network control apparatus 201 may include an SDN controller.

Also, according to an exemplary embodiment, the network control apparatus 201 may control the switch 203 via an interface, such as an openflow interface. Since the openflow interface is well known to one of ordinary skill in the art, details thereof are not provided here.

Figure 3:
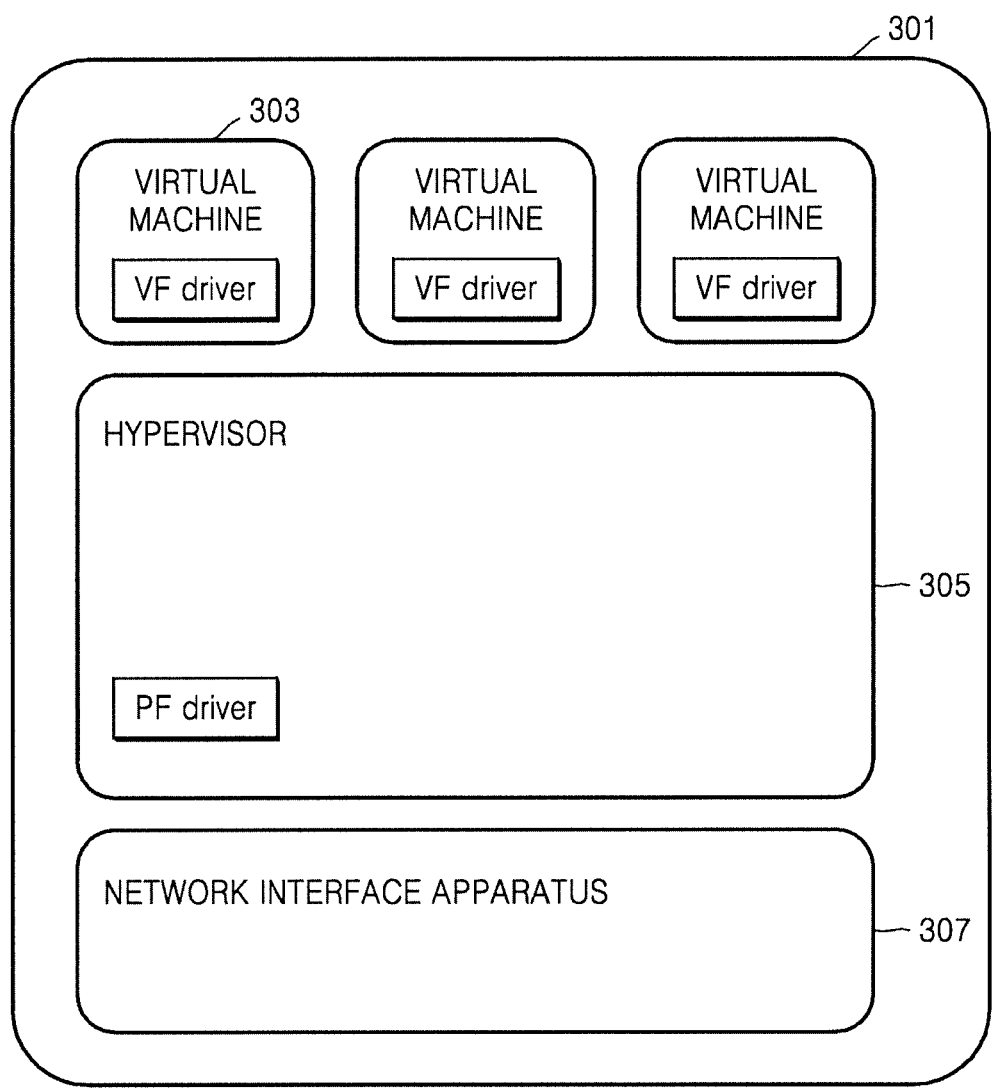
FIG. 3 is a diagram for describing a virtual server according to an exemplary embodiment.

FIG. 3 is a diagram for describing a virtual server 301 according to an exemplary embodiment.

Referring to FIG. 3, the virtual server 301 may be the first server apparatus 101 of FIG. 1 or 2. Also, the virtual server 301 of FIG. 3 may be a server apparatus described hereinafter.

According to an exemplary embodiment, the virtual server 301 may include at least one virtual machine 303. The virtual machine corresponds to at least one OS, wherein at least one OS may each operate as one virtual machine 303. Also, according to an exemplary embodiment, the OS may drive an application.

According to an exemplary embodiment, the virtual machine 303 may control a network interface apparatus 307 via a virtual-function (VF) driver. In other words, the virtual machine 303 may use capabilities of the network interface apparatus 307 via the VF driver. According to an exemplary embodiment, the capabilities of the network interface apparatus 307 usable by the virtual machine 303 may include direct memory access (DMA), but are not limited thereto.

According to an exemplary embodiment, examples of the at least one OS included in the virtual server 303 may include a window OS, a Linux OS, a MAC OS, and a Unix OS, but are not limited thereto.

Also, according to an exemplary embodiment, the at least one OS may include a software switch unit. According to an exemplary embodiment, the software switch unit may be a component that performs virtual switching via software.

According to an exemplary embodiment, the virtual server 301 may include a hypervisor 305.

According to an exemplary embodiment, the hypervisor 305 is a component that manages the OS corresponding to the virtual machine 303 such that the OS may use the network interface apparatus 307, and may denote a logical platform that controls access of the at least one OS to the network interface apparatus 307.

According to an exemplary embodiment, the hypervisor 305 may control the network interface apparatus 307 via a physical-function (PF) driver. The hypervisor 305 is a privileged layer that is capable of using all capabilities of the network interface apparatus 307. In other words, the hypervisor 305 may be a component that operates as a managing unit of the virtual server 301.

According to an exemplary embodiment, the hypervisor 305 may include a virtual machine monitor, but is not limited thereto.

According to an exemplary embodiment, the virtual server 301 may include the network interface apparatus 307. The network interface apparatus 307 is hardware that forms a server, and may include, for example, at least one central processing unit (CPU), a hard disk, a storage device such as a memory, and a network interface card, or may only include a network interface card. According to an exemplary embodiment, the network interface apparatus 307 may include a hardware switch unit.

According to an exemplary embodiment, the virtual server 301 may be one server physically, but one or more servers logically. In other words, the virtual server 301 may be recognized to be a plurality of servers or a single server by a client apparatus based on settings of a user.

According to an exemplary embodiment, the hypervisor 305 may receive at least one command from the network control apparatus 201 of FIG. 2. The at least one command may be included in packet control information.

According to an exemplary embodiment, the at least one command may include a command related to virtual switching and may include a command belonging to various categories related to virtual switching, such as switching, tagging, untagging, editing, filtering, and rate limiting.

According to an exemplary embodiment, switching may be a capability of transmitting a packet to a destination, such as a virtual machine, by checking a certain field of a received packet, and tagging may be a capability of adding a header to a certain location in a packet. Untagging may be a capability of removing a header of a certain location in a packet, editing may be a capability of editing a value of a certain field in a packet, and filtering may be a capability of determining whether to discard a packet by checking a certain field of the packet. Rate limiting may be a capability blocking the number of packets received per second does not exceed a certain rate.

For example, packet control information may include a command for transmitting a packet to a virtual machine having a certain destination address if a header of the packet is the certain destination address, and a command for inserting an additional header to a certain location of a packet.

Generally, it is difficult to simultaneously use a virtual switching-related capability provided by the hypervisor 305 or at least one OS in the virtual server 301, and a virtual switching-related capability provided by the network interface apparatus 307.

In other words, it may be difficult for the network interface apparatus 307 to perform a command related to virtual switching in any one of various methods despite a quick packet processing speed, due to no intervention or minimum intervention of the hypervisor 305. The at least one OS included in the virtual server 301 may perform commands related to various virtual switching, such as switching, editing, and tagging, but since intervention of the hypervisor 305 is required while processing a packet, a packet processing speed of the at least one OS may be slower than that of the network interface apparatus 307.

Accordingly, according to an exemplary embodiment, the virtual server 301 provides a method of improving speed and flexibility by receiving the packet control information including the at least one command and classifying a command performable by the network interface apparatus 307 such that virtual switching performable by the network interface apparatus 307 is quickly performed and commands that are not performable by the network interface apparatus 307 are performed by the at least one OS.

According to an exemplary embodiment, the hypervisor 305 in the virtual server 301 may determine a command performable by the network interface apparatus 307 from among at least one command received from an external apparatus, such as a network control apparatus. In other words, the hypervisor 305 may determine whether the performable command is included in the at least one command received from the external apparatus according to a capability provided by the network interface apparatus 307. Also, the hypervisor 305 determines commands performable by the at least one OS.

According to an exemplary embodiment, the at least one OS may perform the at least one command received from the external apparatus, but the hypervisor 305 determines a command performable by the software switch unit as a second command that is different from a first command.

In other words, according to an exemplary embodiment, the at least one command received from the external apparatus may each be classified into the first command and the second command, wherein the first command may be a command performable by the network interface apparatus 307 and the second command may be a command obtained by excluding the first command from the at least one command received from the external apparatus.

According to an exemplary embodiment, the virtual server 301 may process packets received from a client apparatus based on the first and second commands, by using at least one of the network interface apparatus 307 and the at least one OS.

According to an exemplary embodiment, the performing of the virtual switching by the virtual server 301 based on the first and second commands by using at least one of the network interface apparatus 307 and the at least one OS may mean that the hypervisor 305 in the virtual server 301 controls the network interface apparatus 307 or the at least one OS to perform virtual switching.

According to an exemplary embodiment, if the at least one command received from the external apparatus includes the command performable by the network interface apparatus 307, the hypervisor 305 may control the network interface apparatus 307 to perform the command performable by the network interface apparatus 307 and control the at least one OS to perform a command that is not performable by the network interface apparatus 307.

Also, according to an exemplary embodiment, if the at least one command received from the external apparatus does not include the command performable by the network interface apparatus 307, the hypervisor 305 may control the at least one OS to perform the at least one command received from the external apparatus.

According to an exemplary embodiment, the controlling performed by the hypervisor 305 may mean that the hypervisor 305 transmits a command or command setting information to the network interface apparatus 307 and the at least one OS, and the network interface apparatus 307 and the at least one OS perform virtual switching based on the command or the command setting information received from the hypervisor 305.

According to an exemplary embodiment, the network interface apparatus 307 may receive a packet from a client apparatus. Also, according to an exemplary embodiment, the virtual server 301 may generate a packet. In other words, the at least one OS in the virtual server 301 and an application driven by the OS may generate a packet.

According to an exemplary embodiment, the network interface apparatus 307 and the at least one OS in the virtual server 301 may process a packet to be transmitted to the client apparatus from the virtual server 301, based on the first and second commands.

Also, according to an exemplary embodiment, the hypervisor 305 may receive capability information about the capability of the network interface apparatus 307, and determine whether the at least one command received from the external apparatus includes the command performable by the network interface apparatus 307 based on the received capability information.

Also, according to an exemplary embodiment, the hypervisor 305 may convert the command performable by the network interface apparatus 307 to a command format compatible with the network interface apparatus 307.

For example, since the at least one command in the packet control information received from the network control apparatus may have a command format different from that used in the hardware switch unit of the network interface apparatus 307, the hypervisor 305 may convert the command performable by the network interface apparatus 307 to a format compatible with the network interface apparatus 307, and the network interface apparatus 307 may perform the command having the converted format.

Also, according to an exemplary embodiment, the hypervisor 305 may include a software switch, and the software switch of the hypervisor 305 may receive the at least one command from the external apparatus.

In addition, according to an exemplary embodiment, the hypervisor 305 may convert the capability information received from the network interface apparatus 307 and the at least one command received from the external apparatus respectively to a format of a capability information matrix and a format of a capability vector, and then determine the command performable by the network interface apparatus 307 from among the at least one command received from the external apparatus based on the converted capability information and the converted at least one command.

According to an exemplary embodiment, the network interface apparatus 307 may include an input/output (IO) acceleration apparatus. Alternatively, according to an exemplary embodiment, the hardware switch unit in the network interface apparatus 307 may be an IO acceleration apparatus.

Figure 4:
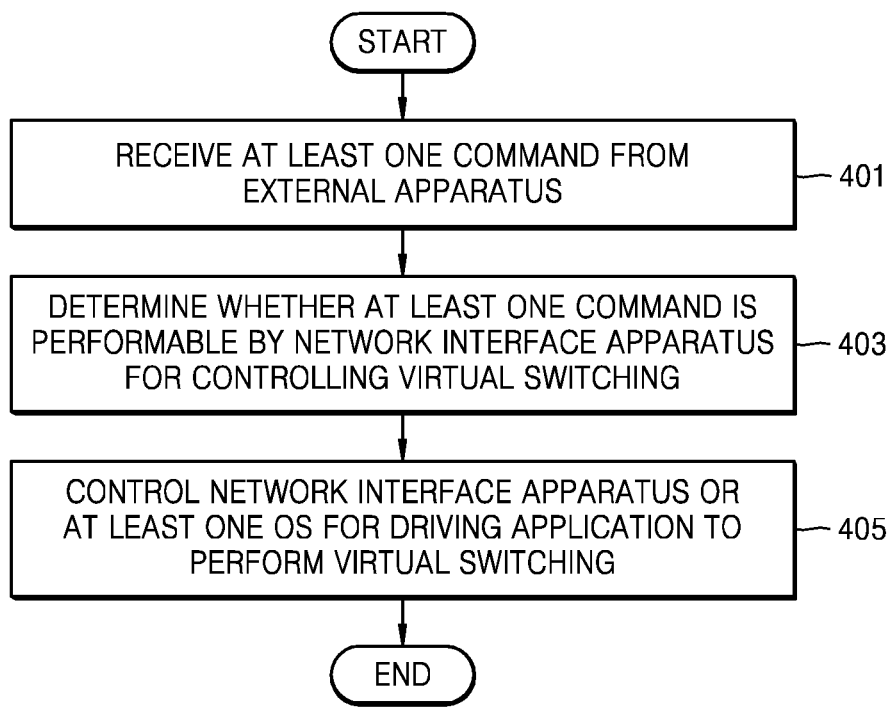
FIG. 4 is a flowchart of a method of controlling virtual switching, according to an exemplary embodiment.

FIG. 4 is a flowchart of a method of controlling virtual switching, according to an exemplary embodiment.

According to an exemplary embodiment, a hardware switch unit may be a component included in a network interface apparatus or may be the network interface apparatus itself. Alternatively, the network interface apparatus may perform functions and operations of the hardware switch unit. Also, a software switch unit is a component included in at least one OS, and the at least one OS may perform functions and operations of the software switch unit.

In operation 401, a server apparatus may receive at least one command from an external apparatus. According to an exemplary embodiment, the external apparatus may be the network control apparatus 201 of FIG. 2, and the at least one command may be included in packet control information. In other words, the server apparatus may obtain the packet control information from the network control apparatus 201.

In operation 403, the server apparatus may determine whether the at least one command is performable by a network interface apparatus for controlling virtual switching.

In other words, according to an exemplary embodiment, the server apparatus may determine a first command that is performable by the network interface apparatus from among the at least one command received from the external apparatus. According to an exemplary embodiment, a hypervisor in a virtual server may determine a command performable by a hardware switch unit of the network interface apparatus.

According to an exemplary embodiment, the server apparatus may receive the packet control information and may determine the first command performable by the hardware switch unit of the network interface apparatus, from among the at least one command included in the packet control information.

According to an exemplary embodiment, the command performable by the network interface apparatus may include a command performable according to capabilities supported by the network interface apparatus.

For example, when the network interface apparatus provides switching and tagging capabilities, and the packet control information includes commands related to switching, tagging, and editing, the hypervisor of the server apparatus may determine that the commands related to switching and tagging are commands performable by the network interface apparatus and the command related to editing is a command that is not performable by the network interface apparatus.

Also, according to an exemplary embodiment, the server apparatus may determine a second command performable by the at least one OS from the at least one command received from the external apparatus. According to another exemplary embodiment, the server apparatus may determine a second command performable by the at least one OS but that is not performable by the network interface apparatus, from the at least one command received from the external apparatus.

According to an exemplary embodiment, the second command may be a command obtained by excluding the first command from the at least one command received from the external apparatus. Also, according to an exemplary embodiment, if the at least one command received from the external apparatus does not include a command performable by the network interface apparatus, the server apparatus may determine that the at least one command received from the external apparatus is the second command.

In operation 405, the server apparatus may control the network interface apparatus or the at least one OS for driving an application to perform virtual switching.

According to an exemplary embodiment, the server apparatus may control at least one of the network interface apparatus and the at least one OS to perform virtual switching based on a result of determining in operation 403.

According to an exemplary embodiment, the hypervisor in the server apparatus may control the hardware switch unit of the network interface apparatus to perform virtual switching based on the first command and control the software switch unit of the at least one OS to perform virtual switching based on the second command.

In other words, the hypervisor in the server apparatus provides at least one of the first and second commands or command setting information to the network interface apparatus and the at least one OS so that the network interface apparatus and the at least one OS respectively perform the first command and the second command.

According to an exemplary embodiment, the server apparatus may receive a packet from a client apparatus. The server apparatus may process the received packet based on the first and second commands, by using at least one of the network interface apparatus and the at least one OS.

In addition, according to an exemplary embodiment, if the at least one command received from the external apparatus does not include a command performable by the network interface apparatus, the at least one OS may process the received packet based on the at least one command received from the external apparatus.

According to an exemplary embodiment, the hardware switch unit of the network interface apparatus in the server apparatus may receive a packet from an external device. Also, the server apparatus may determine whether the hardware switch unit is set to process a packet transmitted or received according to the first command.

According to an exemplary embodiment, the network interface apparatus processes a packet received based on the first command and transmits the processed packet to the at least one OS. Then, the at least one OS may process the received packet based on the second command.

According to an exemplary embodiment, if the at least one command received from the external apparatus does not include a command performable by the network interface apparatus, the network interface apparatus may transmit a received packet to the hypervisor. Then, the hypervisor may transmit the packet to the at least one OS, and the at least one OS may process the received packet based on the at least one command received from the external apparatus.

According to an exemplary embodiment, the server apparatus may process a packet transmitted to the client apparatus based on at least one of the first and second commands, by using at least one of the network interface apparatus and the at least one OS.

According to an exemplary embodiment, the server apparatus may receive the packet control information including the at least one command from a network managing apparatus, and divide the received packet control information into the at least one command.

Also, according to an exemplary embodiment, the command performable by the network interface apparatus from among the at least one command received from the external apparatus may be converted to a command format compatible with the network interface apparatus. For example, the hypervisor in the server apparatus may receive a command for controlling virtual switching, but the network interface apparatus may use a single root IO virtualization (SR-IOV) method like an IO acceleration apparatus, and thus may be unable to use the command as it is. Accordingly, the hypervisor in the server apparatus may convert the command to a command format compatible with the network interface apparatus.

According to an exemplary embodiment, the hypervisor in the server apparatus may receive capability information about the capability of the network interface apparatus and select a command performable by the network interface apparatus from among the at least one command received from the external apparatus based on the capability information.

Also, according to an exemplary embodiment, the hypervisor in the server apparatus may convert the at least one command and the capability information respectively to a format of a capability information matrix and a format of a capability vector, and determine the first command that is performable by the network interface apparatus based on the converted at least one command and the converted capability information, as will be described in detail later with reference to FIGS. 12 and 13.

In addition, according to an exemplary embodiment, the server apparatus may request the external apparatus for the at least one command, and the server apparatus may not request for the at least one command if the number of times the at least one command is requested is equal to or higher than a certain number of times.

Figure 5:
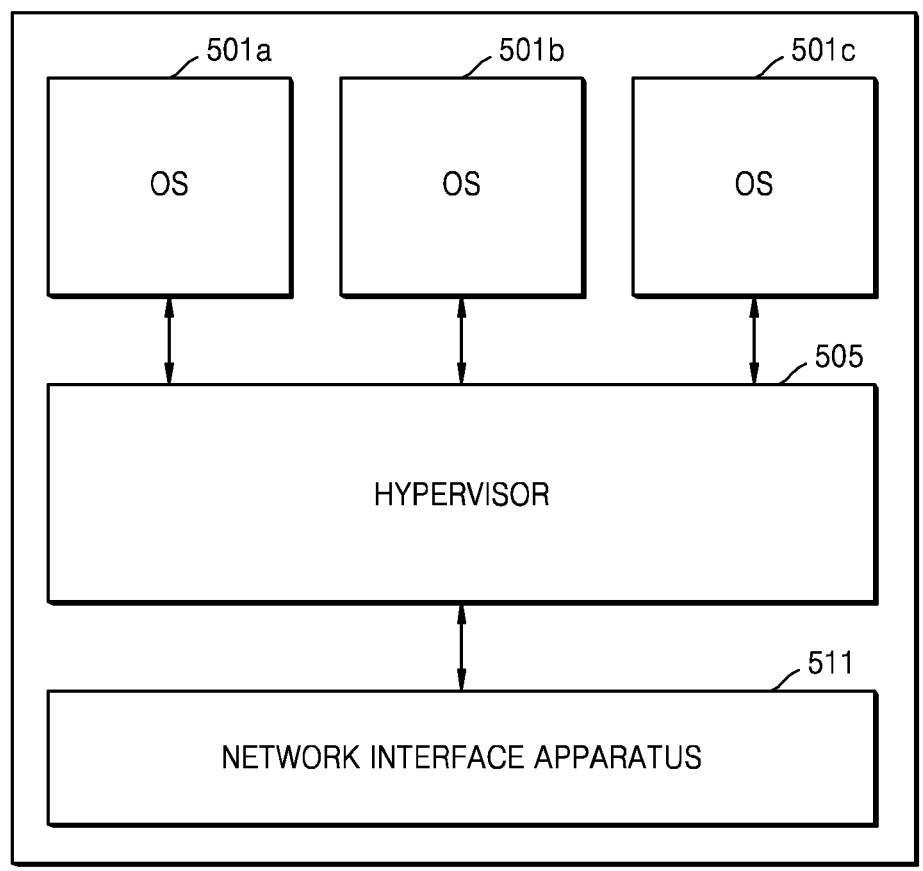
FIG. 5 is a block diagram of a server apparatus according to an exemplary embodiment.

FIG. 5 is a block diagram of a server apparatus 500 according to an exemplary embodiment.

According to an exemplary embodiment, the server apparatus 500 may be the first server apparatus 101 of FIG. 1 or 2.

According to an exemplary embodiment, the server apparatus 500 may include, for example, at least one OS, i.e., OSs 501a through 501c, a hypervisor 505, and a network interface apparatus 511. According to an exemplary embodiment, the hypervisor 505 may be the hypervisor 305 of FIG. 3, and the network interface apparatus 511 may be the network interface apparatus 307 of FIG. 3.

According to an exemplary embodiment, the OSs 501a through 501c may respectively correspond to virtual machines. Also, the OSs 501a through 501c may drive an application. According to an exemplary embodiment, the OSs 501a through 501c may each operate as one virtual server.

According to an exemplary embodiment, the OSs 501a through 501c may process a packet received from the network interface apparatus 511 or the hypervisor 505. According to an exemplary embodiment, a software switch unit included in each of the OSs 501a through 501c may process the packet.

According to an exemplary embodiment, the hypervisor 505 may obtain at least one command from an external apparatus. According to an exemplary embodiment, the external apparatus may be a network control apparatus. Alternatively, the hypervisor 505 may obtain the at least one command based on a user input.

According to an exemplary embodiment, an information obtainer of the hypervisor 505 may obtain the at least one command from the external apparatus, wherein the information obtainer may be included in a software switch unit included in the hypervisor 505, which is different from software switch units included in the OSs 501a through 501c.

According to an exemplary embodiment, the software switch units included in the OSs 501a through 501c may receive the at least one command from the external apparatus.

According to an exemplary embodiment, the hypervisor 505 may determine a first command performable by the network interface apparatus 511 and a second command performable by the OSs 501a through 501c, from among the at least one command received from the external apparatus.

According to an exemplary embodiment, the second command may be a command obtained by excluding the first command from the at least one command received from the external apparatus. In other words, the hypervisor 505 may determine the first command from among the at least one command received from the external apparatus, and consider that other commands, except for the first command, are second commands performable by the OSs 501a through 501c.

According to an exemplary embodiment, the server apparatus 500 may process a packet received from an external device, based on the first and second commands by using at least one of the network interface apparatus 511 and the OSs 501a through 501c.

According to an exemplary embodiment, the hypervisor 505 may set the network interface apparatus 511 and the OSs 501a through 501c to process the first and second commands.

In addition, according to an exemplary embodiment, a command analyzer of the hypervisor 505 may determine a command performable by a hardware switch unit of the network interface apparatus 511 from among the at least one command received from the external apparatus.

According to an exemplary embodiment, the hypervisor 505 or the network interface apparatus 511 may determine whether the hardware switch unit of the network interface apparatus 511 is set to process a packet according to the first command.

According to an exemplary embodiment, if the at least one command received from the external apparatus does not include a command performable by the network interface apparatus 511, the OSs 501a through 501c may process a packet based on the at least one command received from the external apparatus.

For example, if the at least one command received from the external apparatus includes a tagging command for adding a certain header and an editing command for editing a certain header of a received packet, and the network interface apparatus 511 provides a tagging capability or an editing capability, the tagging command and/or the editing command may be processed by the network interface apparatus 511. However, if the network interface apparatus 511 does not provide both the tagging and editing capabilities, the network interface apparatus 511 is unable to perform the at least one command received from the external apparatus and thus the OSs 501a through 501c may process the tagging and editing commands.

According to an exemplary embodiment, when the network interface apparatus 511 is set to process a packet based on the first command, the network interface apparatus 511 may process the packet based on the first command and transmit the processed packet to the OSs 501a through 501c, and the OSs 501a through 501c may process the received packet based on the second command.

According to an exemplary embodiment, if the at least one command received from the external apparatus does not include a command performable by the network interface apparatus 511, the network interface apparatus 511 may receive a packet and transmit the received packet to the hypervisor 505, and the hypervisor 505 may transmit the received packet to the OSs 501a through 501c. The OSs 501a through 501c may process the packet received from the hypervisor 505 based on the at least one command received from the external apparatus.

According to an exemplary embodiment, the hypervisor 505 may include a software switch unit separately from the OSs 501a through 501c, wherein the software switch unit includes the information obtainer and the command analyzer. According to an exemplary embodiment, the software switch unit included in the hypervisor 505 may transmit the packet received from the network interface apparatus 511 to the OSs 501a through 501c.

According to an exemplary embodiment, the OSs 501a through 501c and applications driven by the OSs 501a through 501c may generate a packet, and when the packet is transmitted to a client apparatus, the server apparatus 500 may use the network interface apparatus 511 and the OSs 501a through 501c to process the generated packet based on the first and second commands. Since such an operation corresponds to receiving a packet, details thereof need not be provided.

According to an exemplary embodiment, the hypervisor 505 may obtain packet control information including the at least one command and divide the packet control information into the at least one command. Also, the hypervisor 505 may convert the first command from among the at least one command received from the external apparatus to a format compatible with the network interface apparatus 511.

In addition, according to an exemplary embodiment, the hypervisor 505 may receive capability information about the capability of the network interface apparatus 511, from the network interface apparatus 511. The hypervisor 505 may determine a command performable by the network interface apparatus 511 from among the at least one command include in the packet control information based on the received capability information.

According to an exemplary embodiment, the hypervisor 505 may convert the at least one command received from the external apparatus and the capability information respectively to a format of a capability information matrix and a format of a capability vector, as will be described in detail later with reference to FIGS. 11 and 12.

According to an exemplary embodiment, the at least one command received from the external apparatus may be in any one of various categories related to virtual switching, such as switching, tagging, untagging, editing, and filtering, as described above with reference to FIGS. 1 through 4.

In addition, according to an exemplary embodiment, the hypervisor 505 may request the external apparatus for the at least one command. If the number of times the at least one command is requested is equal to or higher than a certain number of times, the hypervisor 505 may not request the external apparatus for the at least one command.

According to an exemplary embodiment, the network interface apparatus 511 may be an IO acceleration apparatus.

According to an exemplary embodiment, the server apparatus 500 may include a control unit (not shown). Generally, the control unit may control overall operations of the server apparatus 500. In other words, the control unit may include an operation unit, such as a CPU, and may be included in another component, but is not limited thereto.

Figure 6:
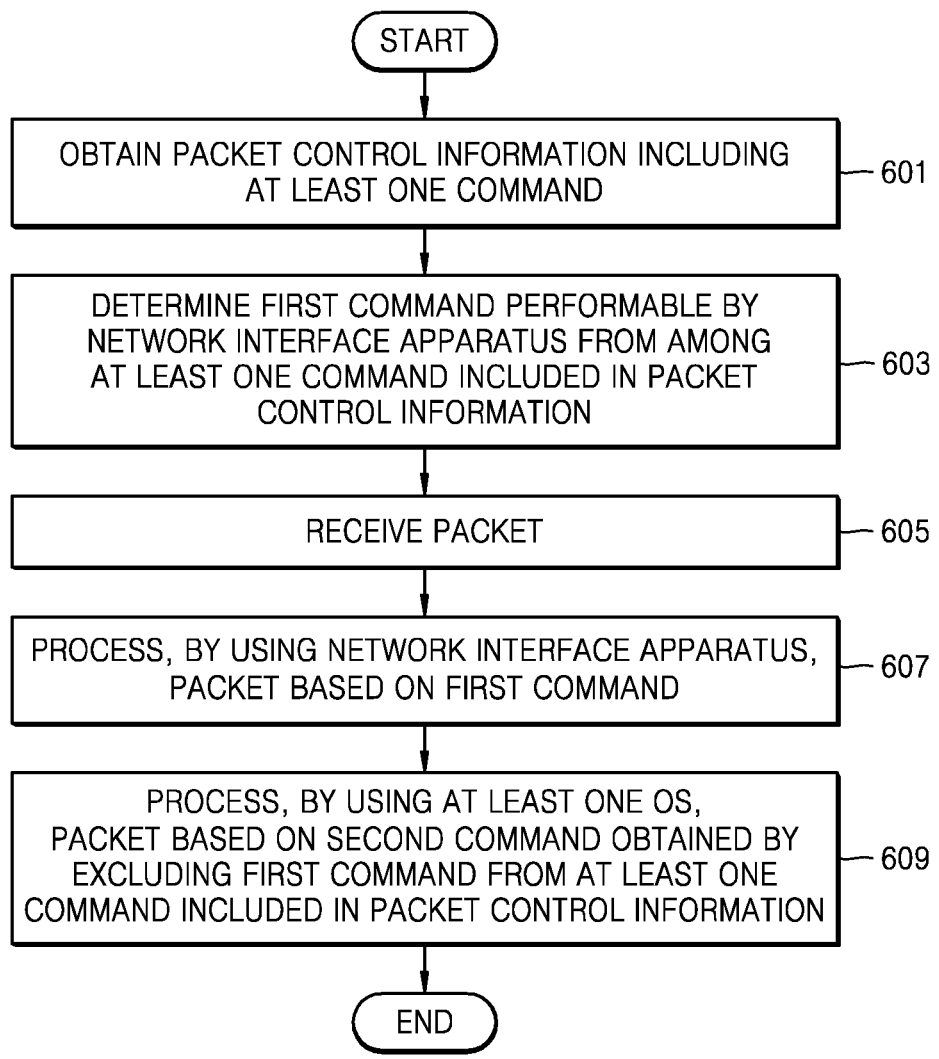
FIG. 6 is a flowchart of a method of processing a received packet, according to an exemplary embodiment.

FIG. 6 is a flowchart of a method of processing a received packet, according to an exemplary embodiment.

In operation 601, a server apparatus may obtain packet control information including at least one command from an external apparatus. According to an exemplary embodiment, the external apparatus may be a network control apparatus and the at least one command may be related to virtual switching.

According to an exemplary embodiment, a hypervisor in the server apparatus may obtain the packet control operation. Operation 601 corresponds to operation 401 of FIG. 4.

In operation 603, the server apparatus may determine a first command performable by a network interface apparatus from among the at least one command included in the packet control information. According to an exemplary embodiment, the hypervisor in the server apparatus may determine the first command performable by the network interface apparatus in the server apparatus.

According to an exemplary embodiment, the server apparatus may determine remaining commands obtained by excluding the first command from the at least one command included in the packet control information as second commands performable by at least one OS.

In operation 605, the server apparatus may receive a packet.

According to an exemplary embodiment, the server apparatus may receive the packet from the network interface apparatus.

In addition, according to an exemplary embodiment, operations 601 and 603 may be performed after operation 605. For example, the server apparatus may receive the packet, obtain the packet control information, and then determine the first command from the at least one command included in the packet control information.

In operation 607, the network interface apparatus of the server apparatus may process the received packet based on the first command determined in operation 603.

In addition, according to an exemplary embodiment, the hypervisor of the server apparatus may provide command setting information about the first command to the network interface apparatus such that the first command is performed. The network interface apparatus may process the received packet based on the command setting information.

In operation 609, the at least one OS of the server apparatus may process the packet based on the second command obtained by excluding the first command from the at least one command included in the packet control information.

According to an exemplary embodiment, the network interface apparatus in the server apparatus processes the packet based on the first command and transmits the processed packet to the at least one OS, and the at least one OS may process the packet received from the network interface apparatus based on the second command.

As described above with reference to FIGS. 4 and 5, if the at least one command included in the packet control information does not include the first command performable by the network interface apparatus, the at least one OS may process the packet based on the packet control information.

According to an exemplary embodiment, the processing of the packet may mean that the packet is transmitted to a destination, data included in the packet is edited or deleted, or data is added to the packet.

Figure 7:
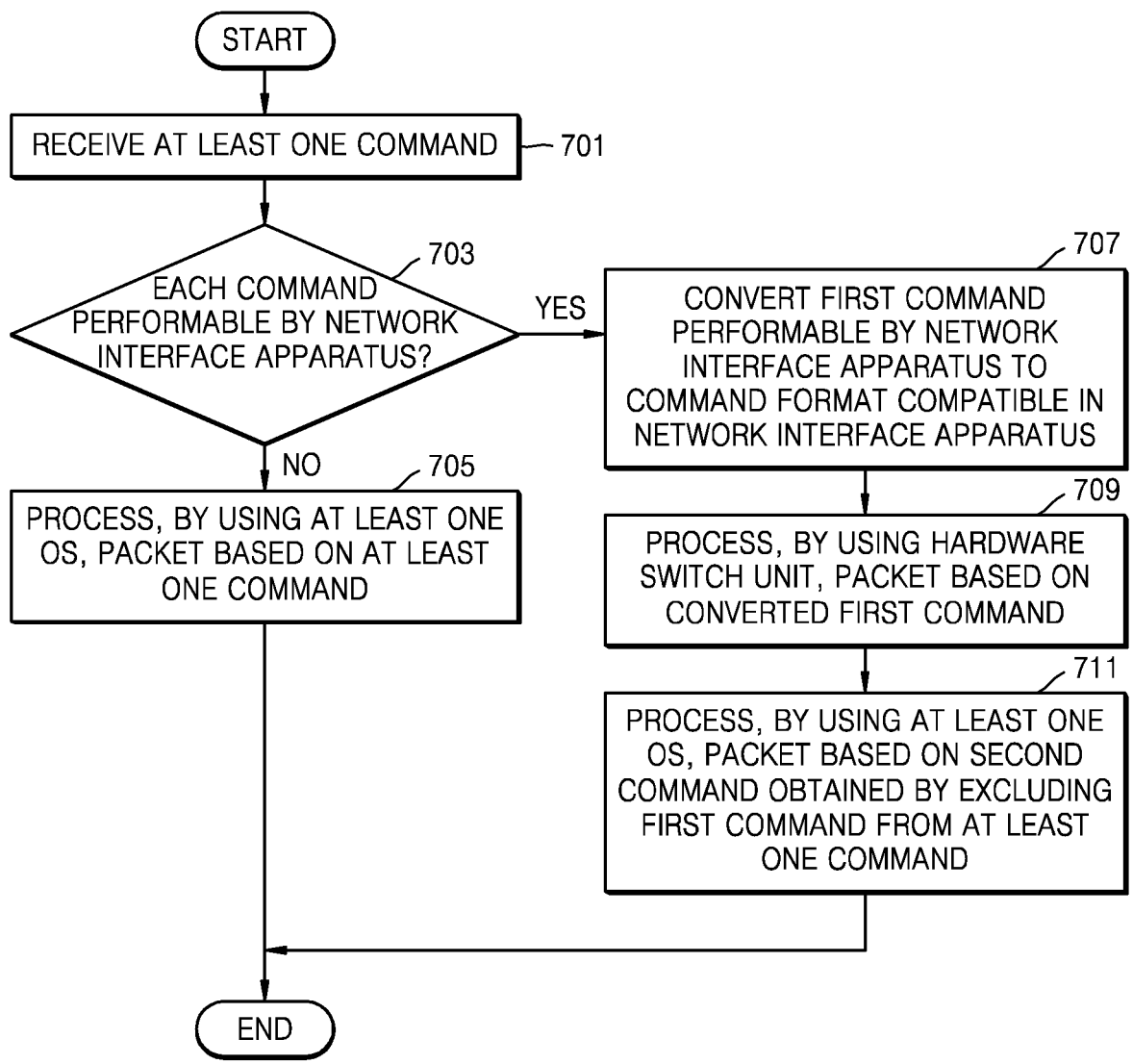
FIG. 7 is a detailed flowchart of a method of performing virtual switching, according to an exemplary embodiment.

FIG. 7 is a detailed flowchart of a method of performing virtual switching, according to an exemplary embodiment.

In operation 701, a server apparatus may receive at least one command. The at least one command may be received from an external apparatus and may include a command related to virtual switching, as described above with reference to FIGS. 1 through 6.

In addition, according to an exemplary embodiment, the server apparatus may receive packet control information including the at least one command and may divide the packet control information into the at least one command.

For example, the packet control information may include a switching-related command for transmitting a packet to a destination based on destination information included in a packet, and a tagging-related command for inserting a generic routing encapsulation (GRE) header after an internet protocol (IP) header in a packet. The server apparatus may obtain the packet control information and divide the packet control information into the switching-related command and the tagging-related command.

In operation 703, the server apparatus may determine whether each of the at least one command received in operation 701 is performable by a network interface apparatus.

According to an exemplary embodiment, the server apparatus may determine whether each command is performable by a hardware switch unit in the network interface apparatus based on capabilities supported by the hardware switch unit.

In operation 705, at least one OS may process the packet based on the at least one command, based on a result of the determining in operation 703. In other words, if the at least one command does not include a command performable by the network interface apparatus, the server apparatus may control the at least one OS to perform the at least one command.

In operation 707, the server apparatus may convert a first command performable by the network interface apparatus to a command format compatible with the network interface apparatus, based on the result of determining in operation 703. In other words, otherwise, if the at least one command includes the first command, the server apparatus may convert the first command to the command format compatible with the network interface apparatus.

For example, the server apparatus may change a command format included in the packet control information to the same format as table information included in the network interface apparatus.

According to an exemplary embodiment, a hypervisor in the server apparatus may set the network interface apparatus to perform the converted first command. Also, the hypervisor in the server apparatus may provide first command setting information for the network interface apparatus to perform the first command.

In operation 709, the server apparatus may process the packet based on the first command converted in operation 707, by using the network interface apparatus.

In operation 711, the server apparatus may process the packet based on a second command obtained by excluding the first command from the at least one command, by using the at least one OS.

In addition, according to an exemplary embodiment, the server apparatus may transmit the packet processed in operation 709 to the at least one OS such that a packet process based on the first command using the network interface apparatus and a packet process based on the second command by using the at least one OS are sequentially performed.

Figure 8:
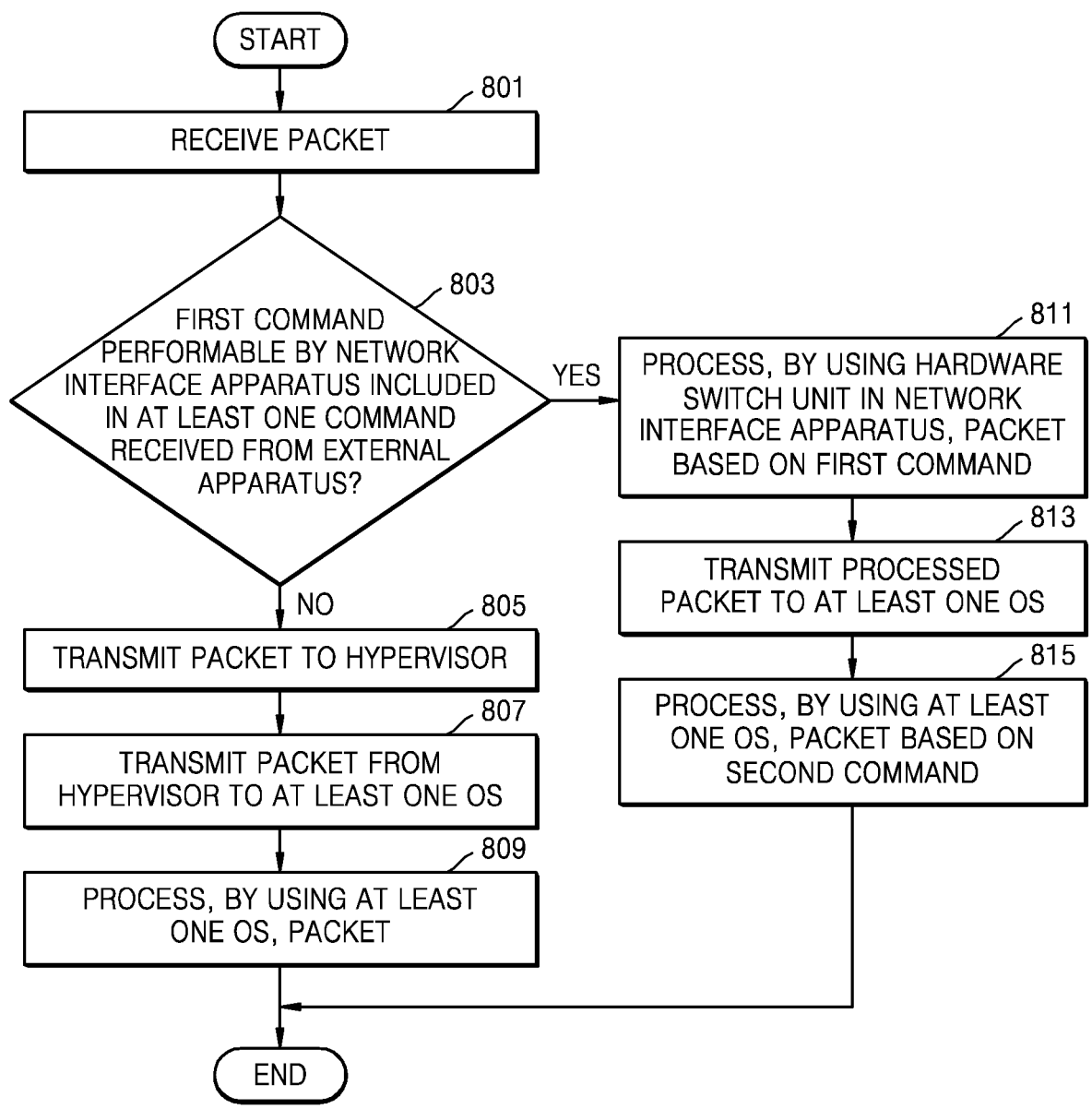
FIG. 8 is a detailed flowchart of a method of processing a received packet, according to another exemplary embodiment.

FIG. 8 is a detailed flowchart of a method of processing a received packet, according to another exemplary embodiment.

In operation 801, a server apparatus receives a packet. According to an exemplary embodiment, a network interface apparatus in the server apparatus may receive the packet. Operation 801 may correspond to operation 605 of FIG. 6.

In operation 803, the server apparatus may determine whether a first command performable by the network interface apparatus is included in at least one command received from an external apparatus. In addition, according to an exemplary embodiment, the server apparatus may determine whether the network interface apparatus is set to process the first command.

According to an exemplary embodiment, in operations 801 and 803, the server apparatus may obtain the at least one command from the external apparatus and determine whether the first command performable by the network interface apparatus is included in the obtained at least one command as described above with reference to FIG. 4 or 6. Based on a result of the determining, the method may further include setting, by using the server apparatus, the network interface apparatus to perform the first command.

In operation 805, the network interface apparatus in the server apparatus may transmit the received packet to a hypervisor based on the result of the determining in operation 803. In other words, if the at least one command received from the external apparatus does not include a command performable by the network interface apparatus, the server apparatus may control the network interface apparatus to transmit the packet to the hypervisor.

In detail, the server apparatus may control the network interface apparatus to receive the packet without processing the packet based on the at least one command received from the external apparatus and to transmit the packet to the hypervisor.

In operation 807, the server apparatus may control the hypervisor to transmit the packet to at least one OS.

In operation 809, the server apparatus may control the at least one OS to process the packet received from the hypervisor, based on the at least one command received from the external apparatus.

In operation 811, otherwise, if the at least one command received from the external apparatus includes a command performable by the network interface apparatus, the server apparatus may control the network interface apparatus to process the packet based on the first command. In other words, the server apparatus may process the packet by using the network interface apparatus.

In operation 813, the server apparatus may control the network interface apparatus to transmit the processed packet to a software switch unit in the at least one OS.

In operation 815, the server apparatus may control the at least one OS to process the packet received from the network interface apparatus, based on a second command. According to an exemplary embodiment, the second command may be a command obtained by excluding the first command from the at least one command received from the external apparatus.

In other words, according to an exemplary embodiment, if a hardware switch unit of the network interface apparatus is capable of performing the at least one command received from the external apparatus, the packet is processed based on the first command, and then the software switch unit of the at least one OS may process the packet based on a command that is not performable by the network interface apparatus, i.e., the second command.

Figure 9:
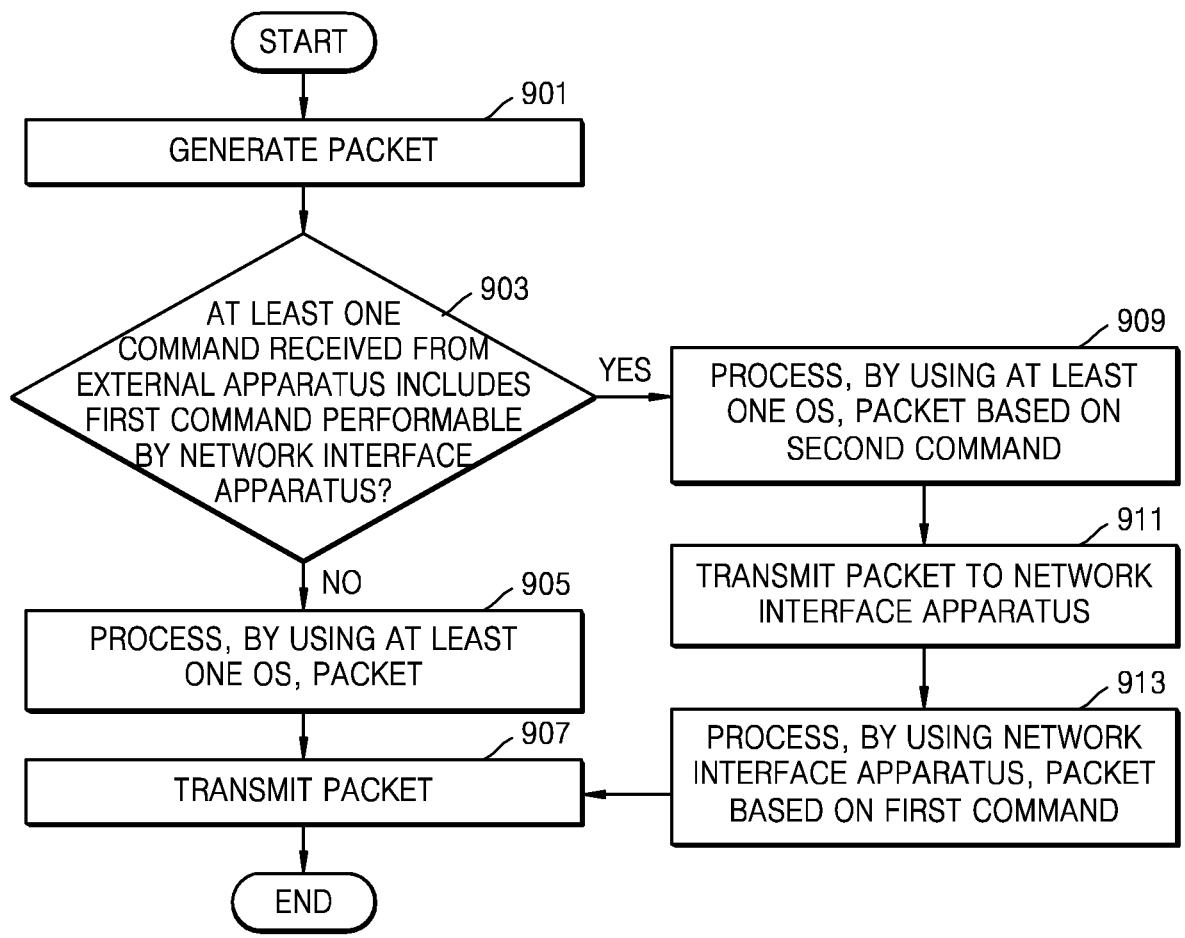
FIG. 9 is a detailed flowchart of a method of processing a packet being transmitted, according to an exemplary embodiment.

FIG. 9 is a detailed flowchart of a method of processing a packet being transmitted, according to an exemplary embodiment.

In operation 901, a server apparatus may generate a packet. According to an exemplary embodiment, at least one OS in the server apparatus or an application driven by the at least one OS may generate the packet.

In operation 903, the server apparatus may determine whether at least one command received from an external apparatus includes a first command performable by a network interface apparatus. In addition, according to an exemplary embodiment, the server apparatus may determine whether the network interface apparatus is set to perform the first command.

According to an exemplary embodiment, since the server may determine a capability supported by the network interface apparatus based on capability information of the network interface apparatus, the server apparatus may determine whether to process the packet according to operations 905 and 907 or according to operations 909 through 913 without having to determine whether the network interface apparatus is set to perform the first command.

According to an exemplary embodiment, in operations 901 and 903, the server apparatus may receive the at least one command from the external apparatus and determine whether the first command is included in the at least one command, as described above with reference to FIG. 4 or 6.

Based on a result of the determining, the server apparatus may further set the network interface apparatus to perform the first command.

If the at least one command received from the external apparatus does not include the first command, the server apparatus may control at least one OS to process the packet generated in operation 901, in operation 905. In other words, the server apparatus may control a software switch unit included in the at least one OS to process the packet.

In operation 907, the server apparatus may transmit the packet. According to an exemplary embodiment, the server apparatus may control the at least one OS and the network interface apparatus such that the packet processed by the at least one OS is transmitted to the network interface apparatus, and the network interface apparatus transmits the processed packet from the at least one OS to a client apparatus. Here, the server apparatus may control the at least one OS, a hypervisor, and the network interface apparatus such that the at least one OS transmits the packet to the network interface apparatus through the hypervisor.

In operation 909, otherwise, if the at least one command received from the external apparatus includes the first command performable by the network interface apparatus, the server apparatus may control a software switch unit in the at least one OS to process the packet based on a second command obtained by excluding the first command from the at least one command received from the external apparatus.

In operation 911, the server apparatus may control the at least one OS and/or the hypervisor such that the packet processed by the at least one OS is transmitted to the network interface apparatus.

In operation 913, the server apparatus may control the network interface apparatus to process the packet received from the at least one OS, based on the first command. In other words, according to an exemplary embodiment, the server apparatus may control a hardware switch unit of the network interface apparatus to process the packet received from the at least one OS, based on the first command.

Figure 10:
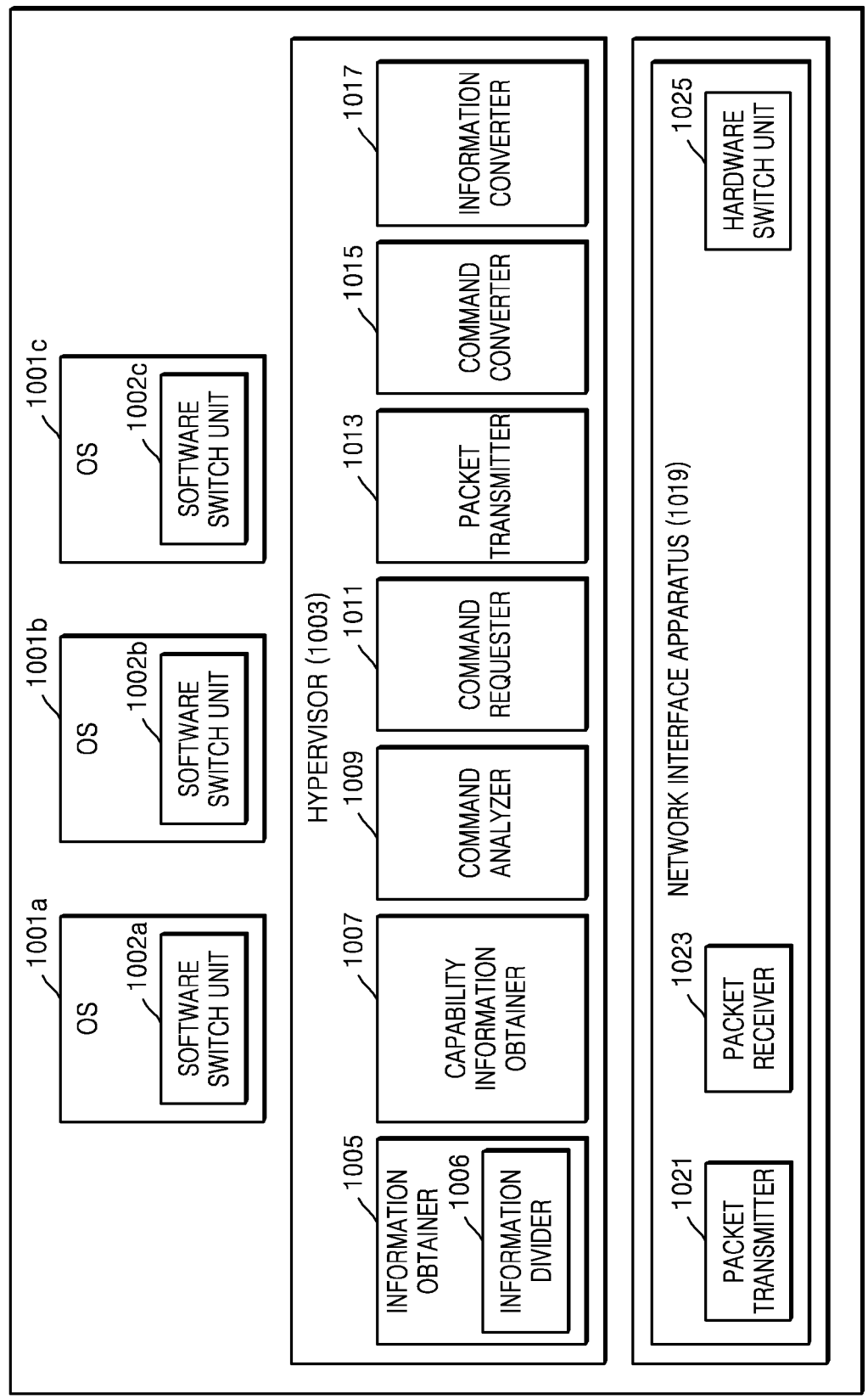
FIG. 10 is a detailed block diagram of a server apparatus that performs virtual switching, according to an exemplary embodiment.

FIG. 10 is a detailed block diagram of a server apparatus 1000 that performs virtual switching, according to an exemplary embodiment.

According to an exemplary embodiment, the server apparatus 1000 may be the first server apparatus 101 of FIG. 1, the virtual server 301 of FIG. 3, or the server apparatus 500 of FIG. 5.

According to an exemplary embodiment, the server apparatus 1000 may include at least one OS, i.e., OSs 1001a through 1001c, a hypervisor 1003, and a network interface apparatus 1019. According to an exemplary embodiment, the OSs 1001a through 1001c may be the OSs 501a through 501c of FIG. 5, the hypervisor 1003 may be the hypervisor 505 of FIG. 5, and the network interface apparatus 1019 may be the network interface apparatus 511 of FIG. 5.

According to an exemplary embodiment, the OSs 1001a through 1001c may respectively include software switch units 1002a through 1002c.

According to an exemplary embodiment, the hypervisor 1003 may include, for example, an information obtainer 1005, a capability information obtainer 1007, a command analyzer 1009, a command requester 1011, a packet transmitter 1013, a command converter 1015, and an information converter 1017.

According to an exemplary embodiment, the information obtainer 1005 may receive at least one command from an external apparatus. Alternatively, the information obtainer 1005 may receive packet control information including at least one command from an external apparatus, such as a network control apparatus.

According to an exemplary embodiment, the information obtainer 1005 may include an information divider 1006. According to an exemplary embodiment, the information divider 1006 may receive the packet control information including the at least one command from the external apparatus and divide the received packet control information into the at least one command.

According to an exemplary embodiment, the command analyzer 1009 analyzes the at least one command received from the external apparatus or divided by the information divider 1006 and determines whether a first command performable by the network interface apparatus is included.

According to an exemplary embodiment, the capability information obtainer 1007 may obtain capability information about capabilities of the network interface apparatus 1019 or a hardware switch unit 1025 of the network interface apparatus 1019. Also, the capability information obtainer 1007 may store the obtained capability information.

According to an exemplary embodiment, the capability information may include information about a virtual switching capability supported by the network interface apparatus 1019, such as a switching capability or a tagging capability. In addition, the capability information may include information about bit strings of a packet received by the network interface apparatus 1019, which are checked before transmitting the packet to a destination.

According to an exemplary embodiment, the command requester 1011 may request the external apparatus for the at least one command. Alternatively, the command requester 1011 may request for packet control information. According to an exemplary embodiment, the network control apparatus may include an SDN controller.

In addition, according to an exemplary embodiment, the command requester 1011 may not request the external apparatus for a command if the number of times a command is requested from the external apparatus is equal to or higher than a certain number of times.

According to an exemplary embodiment, the packet transmitter 1013 may receive the packet from the network interface apparatus 1019 and transmit the received packet to the OSs 1001a through 1001c. According to an exemplary embodiment, the packet transmitter 1013 may be a software switch unit that is different from the software switch units 1002a through 1002c respectively included in the OSs 1001a through 1001c.

In addition, the packet transmitter 1013 may obtain the packet control information from the network control apparatus, or the OSs 1001a through 1001c corresponding to virtual machines included in the server apparatus 1000 may receive the packet control information from the network control apparatus.

According to an exemplary embodiment, the command converter 1015 may convert the first command performable by the network interface apparatus 1019, which is determined by the command analyzer 1009 from among the at least one command obtained by the information obtainer 1005, to a command format compatible with the network interface apparatus 1019.

According to an exemplary embodiment, the information converter 1017 may convert the capability information obtained by the capability information obtainer 1007 and the at least one command obtained by the information obtainer 1005 respectively to a format of a capability information matrix and a format of a capability vector. In other words, according to an exemplary embodiment, the command analyzer 1009 may quickly determine the first command performable by the network interface apparatus 1019 based on the at least one command and the capability information converted by the information converter 1017.

According to an exemplary embodiment, the network interface apparatus 1019 may include a packet transmitter 1021, a packet receiver 1023, and the hardware switch unit 1025.

According to an exemplary embodiment, the packet transmitter 1021 may transmit a packet generated by the server apparatus 1000. According to an exemplary embodiment, applications driven by the OSs 1001a through 1001c may transmit the generated packet to an external device.

According to an exemplary embodiment, the packet receiver 1023 may receive a packet from a client apparatus.

According to an exemplary embodiment, the hardware switch unit 1025 may process the transmitted or received packet based on settings of the hypervisor 1003.

According to an exemplary embodiment, the network interface apparatus 1019 may include an IO acceleration card.

According to an exemplary embodiment, it may be determined whether the network interface apparatus 1019 is set to process the packet based on the first command determined by the command analyzer 1009. In other words, according to an exemplary embodiment, the server apparatus 1000 may determine whether the network interface apparatus 1019 is set to process a packet based on the first command, when the packet is transmitted or received.

According to an exemplary embodiment, the server apparatus 1000 may include a control unit (not shown). Generally, the control unit may control overall operations of the server apparatus 1000. In other words, the control unit may include an operation unit, such as a CPU, or may be included in another component, but is not limited thereto.

Figure 11:
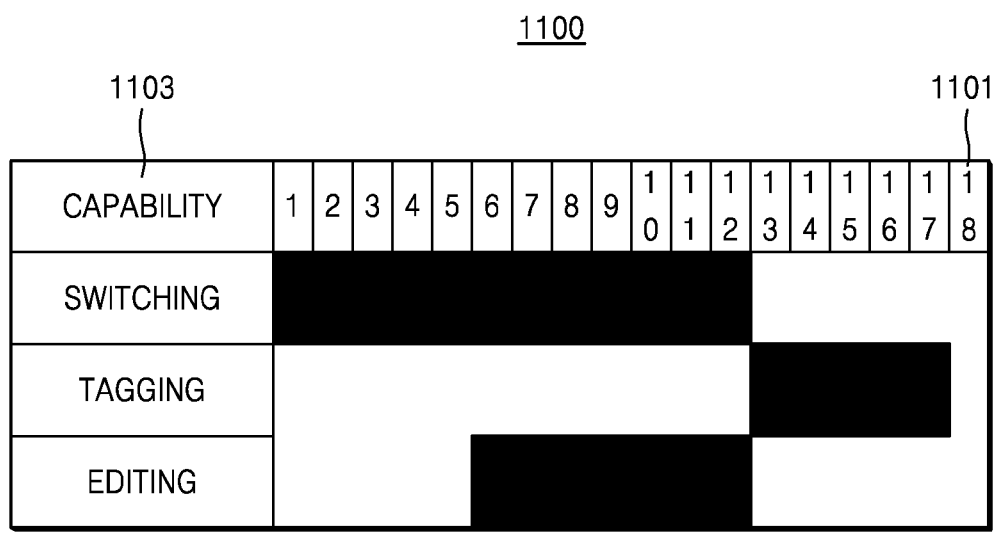
FIG. 11 is a diagram for describing capability information according to an exemplary embodiment.

FIG. 11 is a diagram for describing capability information according to an exemplary embodiment.

A network interface apparatus included in a server apparatus may provide different capabilities to control a packet, based on a manufacturer, a model, and a version. Thus, the first server apparatus 101 of FIG. 1 or 2, the virtual server 301 of FIG. 3, the server apparatus 500 of FIG. 5, or the server apparatus 1000 of FIG. 10 may obtain the capability information provided by a network interface apparatus and determine whether the network interface apparatus is capable of performing at least one command received from an external apparatus based on the capability information.

According to an exemplary embodiment, information about the capability of the network interface apparatus is referred to as the capability information. According to an exemplary embodiment, the capability information may denote information about capabilities related to virtual switching.

According to an exemplary embodiment, the server apparatus may convert the capability information to a format of a capability information matrix 1100. The capability information matrix 1100 may have a format shown in FIG. 11.

Referring to FIG. 11, a left column 1103 of the capability information matrix 1100 may indicate virtual switching capabilities provided by the network interface apparatus. In other words, the left column 1103 may indicate various categories of virtual switching capabilities, such as switching, tagging, editing, and filtering.

A right column 1101 of the capability information matrix 1100 of FIG. 11 may indicate an offset of a packet. Here, an offset of a packet denotes a bit string of the packet and indicates which bit (or byte) of the packet is checked during switching, to which bit a header is insertable, and which bit is editable. In other words, shaded regions in FIG. 11 indicate bits of a bit string of the packet, which may be checked or edited or to which a bit may be added, by using capabilities provided by the network interface apparatus.

According to the capability information matrix 1100 of FIG. 11, the network interface apparatus may check the first bit to $12^{th}$ bit from the bit string of the packet to check a destination of the packet and provide a switching capability, may provide a tagging capability for adding a new header to the $13^{th}$ to $17^{th}$ bits, and may provide an editing capability for editing the $6^{th}$ to $12^{th}$ bits.

In addition, according to an exemplary embodiment, the server apparatus may store the capability information matrix 1100 obtained by converting the capability information.

According to an exemplary embodiment, the capability information matrix 1100 of FIG. 11 is only an example for storing and converting the capability information, and thus the capability information may be converted to and stored in any one of a variety of table formats or a matrix format different from that of FIG. 11, and is not limited thereto.

Figure 12:
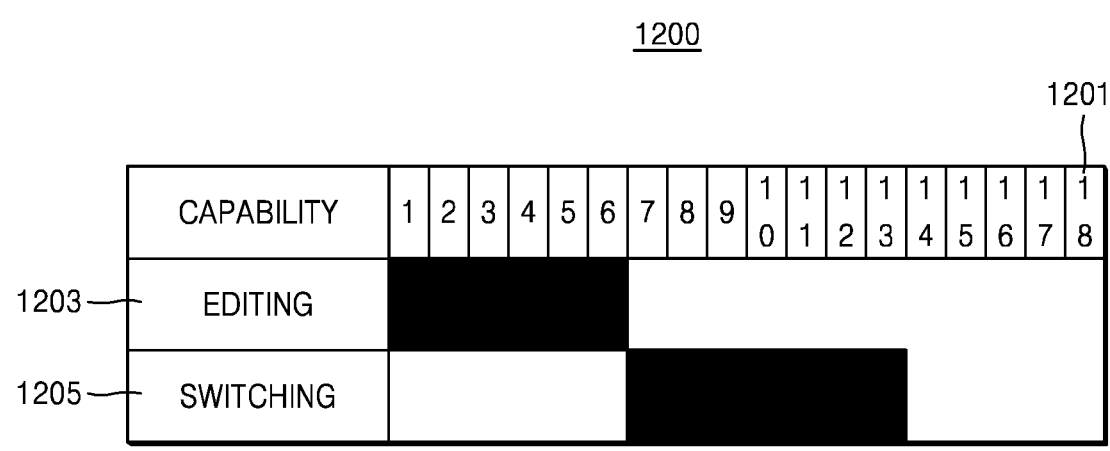
FIG. 12 is a diagram for describing packet control information according to an exemplary embodiment.

FIG. 12 is a diagram for describing packet control information according to an exemplary embodiment.

As described above with reference to FIGS. 1 through 10, the packet control information may include at least one command related to packet control. In other words, a server apparatus may receive the at least one command from an external apparatus, or may receive the packet control information including the at least one command.

According to an exemplary embodiment, the server apparatus may receive the at least one command from the external apparatus, such as a network control apparatus, and convert the at least one command to a format of capability vectors 1200. The capability vectors 1200 may have a format shown in FIG. 12.

In FIG. 12, a first command and a second command included in the packet control information are converted to the capability vectors 1200.

A right column 1201 of the capability vectors 1200 of FIG. 12 may indicate an offset of a packet like the right column 1101 of FIG. 11.

Referring to FIG. 12, the first command indicated by a first capability vector 1203 is a command related to editing and is a command for editing the first to $6^{th}$ bits in a bit string of the packet. The first capability vector 1203 of FIG. 12 is obtained by converting the first command to a capability vector.

The second command indicated by a second capability vector 1205 is a command for switching the packet by checking the $6^{th}$ to $12^{th}$ bits of the bit string of the packet. The second capability vector 1205 of FIG. 12 is obtained by converting the second command to a capability vector. In other words, a shaded region of the first capability vector 1203 indicates bits of the bit string of the packet, which are checked or edited or to which a bit is added, for a packet process, after the server apparatus analyzes the first command.

According to an exemplary embodiment, the server apparatus may compare the capability information matrix 1100 of FIG. 11 and the capability vectors 1200 of FIG. 12 so as to determine the first command performable by the network interface apparatus.

In other words, referring to the first capability vector 1203 of FIG. 12, the first command is a command for editing the first to $6^{th}$ bits of the bit string of the packet, but referring to the capability information matrix 1100 of FIG. 11, the network interface apparatus only provides a capability of editing the $6^{th}$ to $12^{th}$ bits, and thus the first command is a command that is not performable by the network interface apparatus 1019 of FIG. 11.

On the other hand, referring to the second capability vector 1205 of FIG. 12, the second command is a command for switching the packet by checking the $6^{th}$ to $12^{th}$ bits of the bit string of the packet, and referring to the capability information matrix 1100 of FIG. 11, the network interface apparatus provides a capability of checking and switching first to $12^{th}$ bits, and thus the second command is a command that is performable by the network interface apparatus 1019 of FIG. 11.

In other words, according to an exemplary embodiment, if a shaded region of a capability vector is included in a shaded region of a capability information matrix, the server apparatus may determine a command to be performable by the network interface apparatus 1019 or a hardware switch unit.

According to an exemplary embodiment, the server apparatus may store a capability vector obtained by converting packet control information.

In addition, according to an exemplary embodiment, when the server apparatus converts at least one command received from an external apparatus to a format of a capability vector, the server apparatus may store, in a format different from the format of a capability vector, information to be transmitted to a certain destination according to a certain bit string and information required to change the certain bit string to a certain value.

For example, when packet control information includes a command related to editing that if a $3^{rd}$ bit of a bit string of a packet is 0, the $3^{rd}$ bit is changed to 1, and if the $3^{rd}$ bit is 1, the $3^{rd}$ bit is not changed, the server apparatus may convert the command to a capability vector based on a category of the command related to editing and information that the command is related to the editing of the $3^{rd}$ bit, and may store a condition the command is actually performed and information about a value to be changed separately from the capability vector. Also, the server apparatus may insert the separately stored information to command setting information and transmit the command setting information to a network interface apparatus or at least one OS.

According to an exemplary embodiment, the capability vectors 1200 of FIG. 12 are only an example of storing and converting the at least one command received from the external apparatus, and thus the at least one command received from the external apparatus may be converted to and stored in any one of various table formats or a format different from that of FIG. 12, and is not limited thereto.

Figure 13:
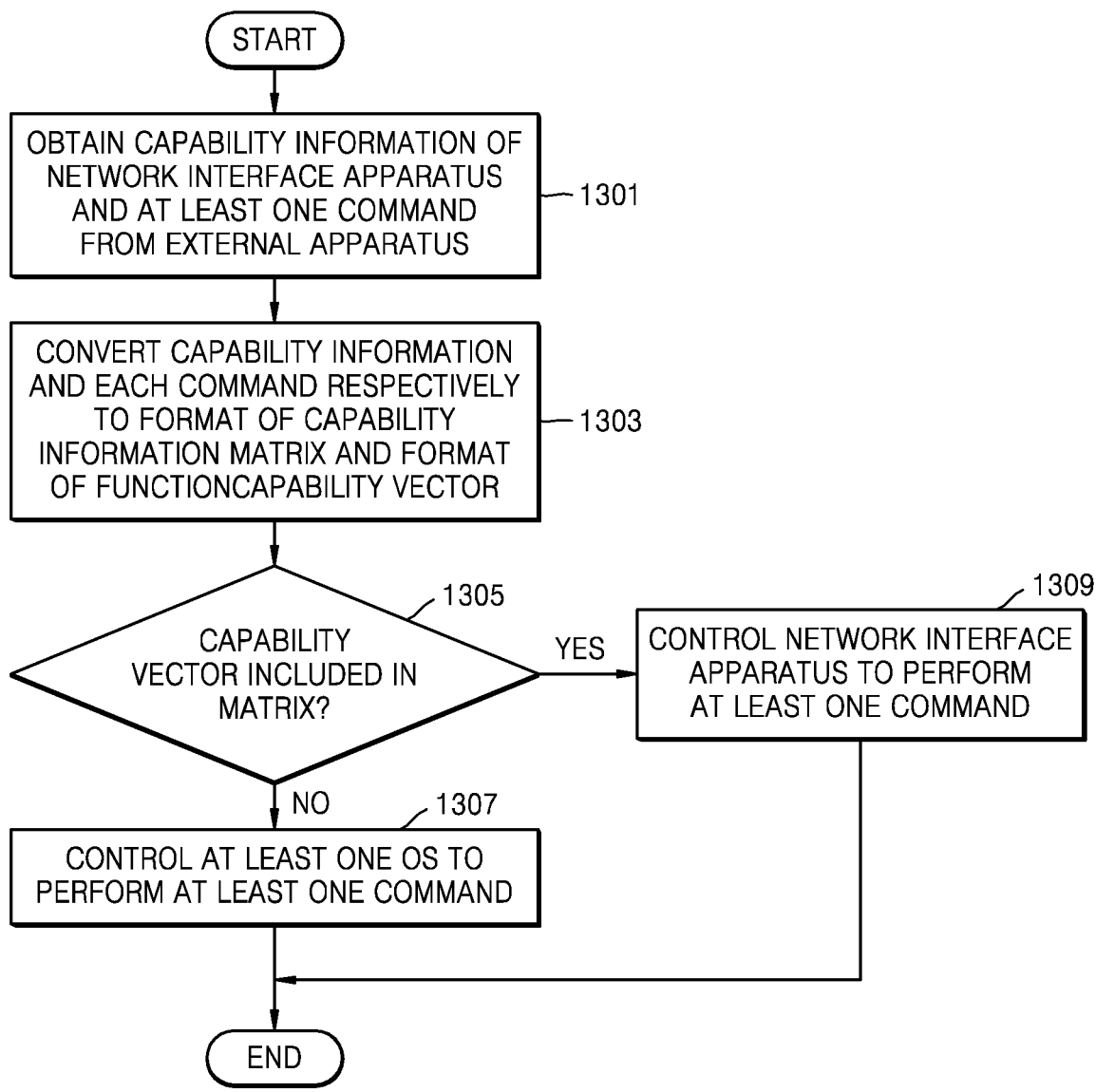
FIG. 13 is a flowchart of a method of determining whether a command is performable by a network interface apparatus, according to an exemplary embodiment.

FIG. 13 is a flowchart of a method of determining whether a command is performable by a network interface apparatus, according to an exemplary embodiment.

In operation 1301, a server apparatus may obtain capability information of the network interface apparatus and obtain packet control information including at least one command from an external apparatus. According to an exemplary embodiment, the server apparatus may receive the packet control information from the external server.

In operation 1303, the server apparatus may convert the capability information and the at least one command respectively to a format of a capability information matrix and a format of a capability vector. The converting to the format of the capability information matrix and the format of the capability vector has been described above with reference to FIGS. 11 and 12 as an example.

In operation 1305, the server apparatus determines an inclusion relationship between the capability vector obtained by converting the at least one command and the capability information matrix obtained by converting the capability information. In other words, as described above with reference to FIG. 12, since the capability vector and the capability information matrix are converted to the same format, the server apparatus may quickly determine whether the at least one command obtained from the external apparatus is performable by the network interface apparatus.

If it is determined that there is no capability vector included in the capability information matrix in operation 1305, the server apparatus may control at least one OS to perform the at least one command obtained from the external apparatus in operation 1307.

Otherwise, if it is determined that at least one capability vector is included in the capability information matrix in operation 1305, the server apparatus may select the capability vector included in the capability information matrix and control the network interface apparatus to perform a command corresponding to the selected capability vector in operation 1309.

In other words, according to an exemplary embodiment, the server apparatus may convert the capability information and the at least one command respectively to the format of the capability information matrix and the format of the capability vector so as to determine whether the at least one command is performable based on the capability information.

Figure 14:
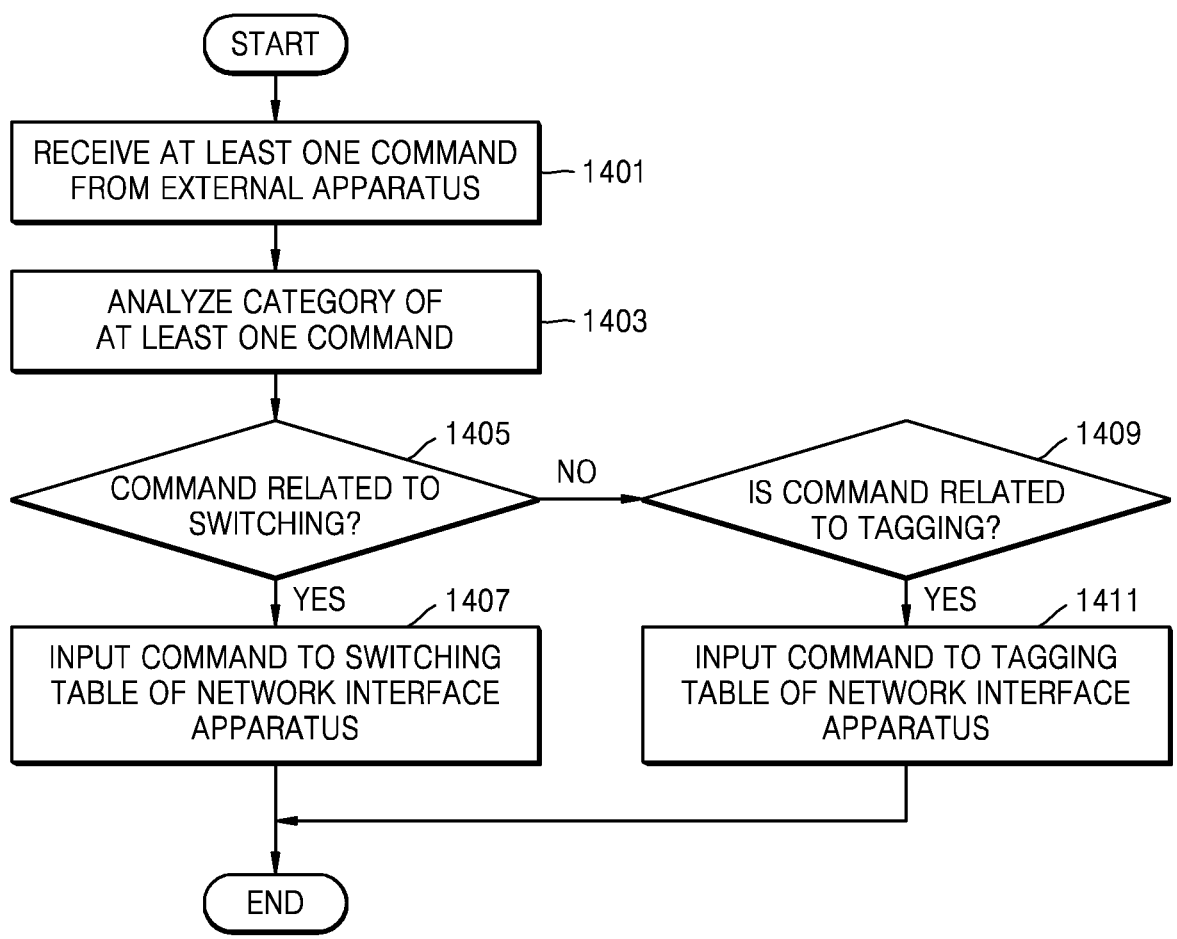
FIG. 14 is a flowchart of a method of setting a command to a network interface apparatus, according to an exemplary embodiment.

FIG. 14 is a flowchart of a method of setting a command to a network interface apparatus, according to an exemplary embodiment.

In operation 1401, a server apparatus may receive at least one command from an external apparatus. According to an exemplary embodiment, the server apparatus may receive packet control information including the at least one command from the external apparatus. Operation 1401 corresponds to related details described above with reference to FIGS. 1 through 10.

In operation 1403, the server apparatus may analyze a category of the at least one command received in operation 1401. In other words, the server apparatus may analyze which command received in operation 1401 is related to virtual switching.

According to an exemplary embodiment, the category of the at least one command may include switching, editing, tagging, untagging, filtering, or rate limiting, but is not limited thereto. In other words, according to an exemplary embodiment, the category may denote a classification standard based on various virtual switching operations.

In operation 1405, the server apparatus may determine whether each of the at least one command is a command related to switching.

If it is determined that one of the at least one command is a command related to switching in operation 1405, the server apparatus may input the one command to a switching table stored or set in the network interface apparatus in operation 1407.

Otherwise, if it is determined that there is no command related to switching from among the at least one command in operation 1405, the server apparatus may determine whether each of the at least one command is a command related to tagging in operation 1409.

If it is determined that one of the at least one command is a command related to tagging in operation 1409, the server apparatus may input the one command to a tagging table stored or set in the network interface apparatus in operation 1411.

In FIG. 14, the at least one command is classified based on two categories, but FIG. 14 is only an example of setting the packet control information to the network interface apparatus, and each command may be classified and input based on at least one category.

Figure 15:
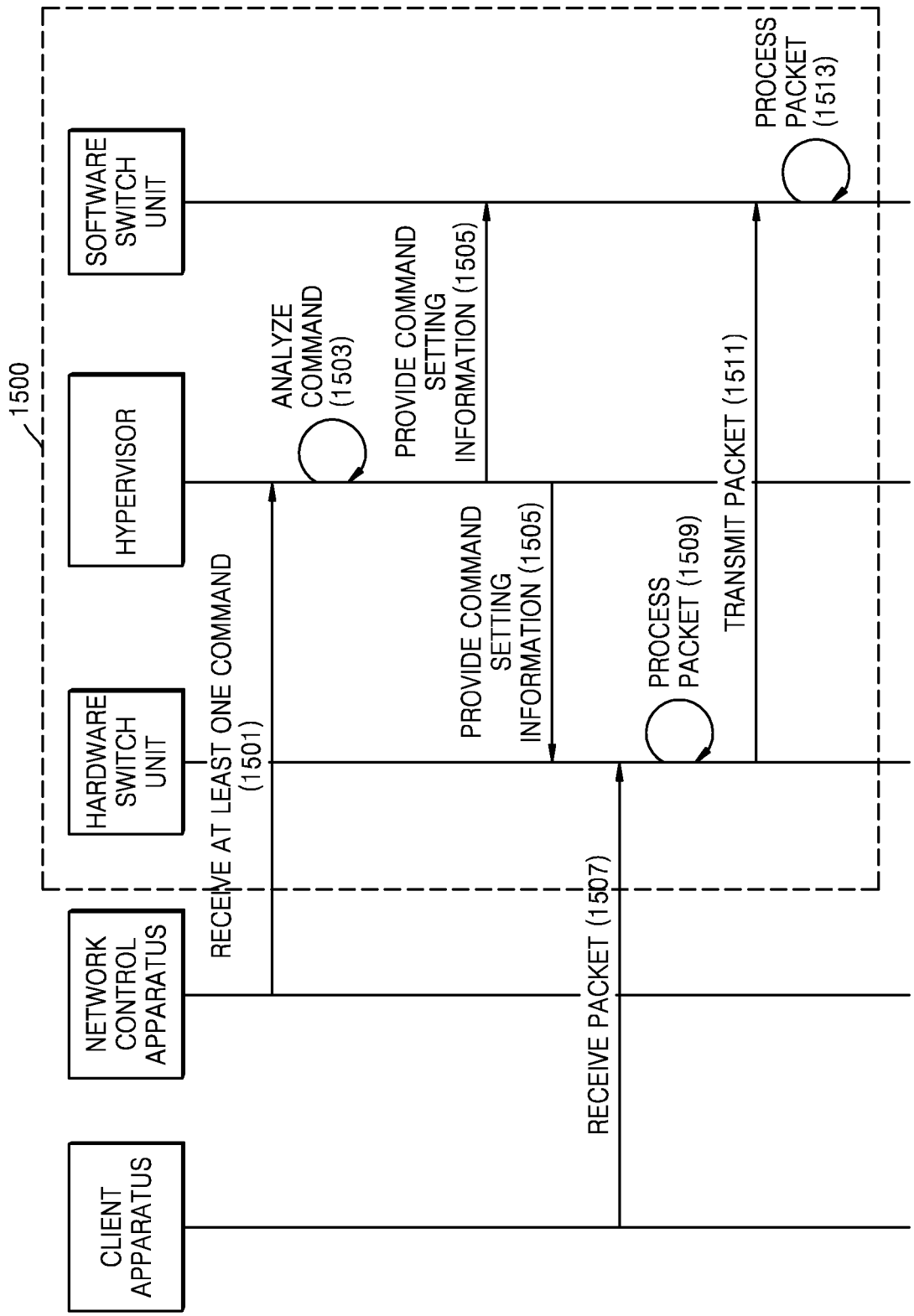
FIG. 15 is a diagram for describing a flow of virtual switching according to an exemplary embodiment.

FIG. 15 is a diagram for describing a flow of virtual switching according to an exemplary embodiment.

Referring to FIG. 15, a block 1500 indicated by a dashed line is a flow processed in a server apparatus.

According to an exemplary embodiment, a hardware switch unit is a component included in a network interface apparatus and may correspond to the hardware switch unit 1025 of FIG. 10. Also, a software switch unit is a component included in at least one OS and may correspond to any one of the software switch units 1002a through 1002c of FIG. 10.

In operation 1501, a hypervisor in the server apparatus may receive at least one command from an external apparatus, such as a network control apparatus, as described above with reference to FIGS. 1 through 10.

In operation 1503, the hypervisor may analyze the at least one command received from the external apparatus. According to an exemplary embodiment, the hypervisor may obtain packet control information including the at least one command and may determine a command performable by the hardware switch unit from among the at least one command included in the packet control information.

According to an exemplary embodiment, the hypervisor may receive capability information about the capability of the hardware switch unit from the hardware switch unit and determine whether the at least one command included in the packet control information is performable by the hardware switch unit based on the received capability information.

In operation 1505, the hypervisor may provide command setting information for controlling the hardware switch unit and the software switch unit to process the at least one command based on a result of analyzing in operation 1503.

According to an exemplary embodiment, the command setting information is information for controlling the hardware switch unit and the software switch unit to set commands related to virtual switching and may include categories of commands, details about commands, formats of commands, and destination addresses.

In operation 1507, the hardware switch unit may receive a packet from a client apparatus.

In operation 1509, the hardware switch unit may process the packet received from the client apparatus based on the command setting information received from the hypervisor in operation 1505.

According to an exemplary embodiment, if the at least one command received from the external apparatus does not include a command performable by the hardware switch unit, the hypervisor may not provide the command setting information to the hardware switch unit.

In addition, according to an exemplary embodiment, if the hardware switch unit is not provided with the command setting information from the hypervisor, the hardware switch unit may transmit the packet received from the client apparatus to the hypervisor without processing the packet.

In operation 1511, the hardware switch unit may transmit the processed packet to the software switch unit. According to an exemplary embodiment, the software switch unit may be included in the at least one OS and may be a destination for the processed packet.

In operation 1513, the software switch unit may process the packet received from the hardware switch unit based on the command setting information received from the hypervisor in operation 1505.

An apparatus described herein may include a processor, a memory for storing program data and executing it, a permanent storage such as a disk drive, a communications port for handling communication with external devices, and user interface devices, including a display, keys, etc. When software modules are involved, these software modules may be stored as program instructions or computer-readable codes executable on the processor on a computer-readable media such as read-only memory (ROM), random-access memory (RAM), CD-ROMs, magnetic tapes, floppy disks, and optical data storage devices. The computer-readable recording medium may also be distributed over network-coupled computer systems so that the computer-readable code is stored and executed in a distributed fashion. This media can be read by the computer, stored in the memory, and executed by the processor. Any one or more of the software modules described herein may be executed by a dedicated hardware-based computer or processor unique to that unit or by a hardware-based computer or processor common to one or more of the modules. The methods described here may be executed on a general purpose computer or processor or may be executed on a particular machine such as the server apparatus and hypervisor described herein.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the inventive concept, reference has been made to the exemplary embodiments illustrated in the drawings, and specific language has been used to describe these embodiments. However, no limitation of the scope of the inventive concept is intended by this specific language, and the inventive concept should be construed to encompass all embodiments that would normally occur to one of ordinary skill in the art.

The exemplary embodiments may be described in terms of functional block components and various processing steps. Such functional blocks may be realized by any number of hardware and/or software components configured to perform the specified functions. For example, the exemplary embodiments may employ various integrated circuit components, e.g., memory elements, processing elements, logic elements, look-up tables, and the like, which may carry out a variety of functions under the control of one or more microprocessors or other control devices. Similarly, where the elements of the exemplary embodiments are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the exemplary embodiments may employ any number of general techniques for electronics configuration, signal processing and/or control, data processing, and the like. The words "mechanism" and "element" are used broadly and are not limited to mechanical or physical embodiments, but can include software routines in conjunction with processors, etc.

The particular implementations shown and described herein are illustrative examples of the inventive concept and are not intended to otherwise limit the scope of the inventive concept in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a", "an", and "the" and similar referents in the context of describing the inventive concept (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the inventive concept and does not pose a limitation on the scope of the inventive concept unless otherwise claimed. Numerous modifications and adaptations will be readily apparent to those of ordinary skill in this art without departing from the spirit and scope of the inventive concept.

What is claimed is:

1. A method of controlling virtual switching in a server, the method comprising:
   receiving capability information indicating which of virtual switching capabilities a network interface apparatus supports, from the network interface apparatus;
   determining a first command performable by the network interface apparatus and a second command not performable by the network interface apparatus based on the capability information;
   receiving packet control information including at least one command to control the virtual switching from an external apparatus;
   determining whether the at least one command included in the received packet control information corresponds to the first command or the second command based on identifying of which virtual switching capabilities the network interface apparatus supports using the capability information and the packet control information received;
   providing first command setting information associated with the first command to the network interface apparatus to perform virtual switching based on the first command when the at least one command includes the first command;
   providing second command setting information associated with the second command to at least one operating system to perform virtual switching based on the second command when the at least one command does not include the first command but includes the second command;
   receiving packets to be processed by the server and controlling processing of the received packets according to the following:
      in response to determining that the at least one command includes the first command, controlling the network interface apparatus to process the received packets using the first command setting information and transmitting the processed packets to the at least one operating system, and
      in response to determining that the at least one command does not include the first command, recognizing the at least one command as the second command and transmitting the received packets from the server to the at least one operating system to directly process the received packets using the second command setting information,
   converting the capability information to a format of a capability information matrix, and
   converting the at least one command received from the external apparatus to a format of a capability vector,
   wherein the determining of whether the at least one command included in the received packet control information corresponds to the first command or the second command comprises determining whether the capability vector is included in the capability information matrix.

2. The method of claim 1, wherein the determining of whether the at least one command in the received packet control information corresponds to the first command or the second command comprises converting the at least one command corresponding to the first command to a command format compatible with the network interface apparatus.

3. The method of claim 1, wherein the determining of whether the at least one command in the received packet control information corresponds to the first command or the second command comprises analyzing a category of a command performable by the network interface apparatus, and inputting the at least one command correspond to the first command to a table in the network interface apparatus, which corresponds to the category, based on a result of the analyzing.

4. The method of claim 1, wherein the at least one command comprises a command related to at least one of switching, tagging, untagging, editing, filtering, and rate limiting.

5. The method of claim 1, wherein the at least one operating system comprises a software switch unit to perform virtual switching based on the second command, and the network interface apparatus comprises a hardware switch unit to perform virtual switching based on the first command.

6. The method of claim 1, further comprising:
   requesting the external apparatus for the at least one command,
   wherein the external apparatus is not requested for the at least one command when a number of times the at least one command is requested is equal to or higher than a certain number of times.

7. A non-transitory computer-readable recording medium having recorded thereon a program for executing the method of claim 1.

8. A server apparatus comprising:
   at least one operating system to drive an application;

a network interface apparatus to perform virtual switching; and a processor configured to control access to the at least one operating system and the network interface apparatus by receiving capability information indicating which of virtual switching capabilities the network interface apparatus supports, from the network interface apparatus, determining a first command performable by the network interface apparatus and a second command not performable by the network interface apparatus based on the capability information, determining whether the at least one command included in the received packet control information corresponds to the first command or the second command based on identifying of which virtual switching capabilities the network interface apparatus supports using the capability information and the packet control information received, providing first command setting information associated with the first command to the network interface apparatus to control the network interface apparatus to perform virtual switching based on the first command when the determining by the processor determines that the first command is included in the at least one command, providing second command setting information associated with the second command to the at least one operating system to control the at least one operating system to perform the virtual switching based on the second command when the determining by the processor determines that the first command is not included in the at least one command but includes the second command, controlling processing of packets that are received according to the following:

when the processor determines that the first command is included in the at least one command, control the network interface apparatus to process packets received by the server using the first command setting information and transmit the processed packets to the at least one operating system, and when the processor determines the at least one command does not include the first command, recognizing the at least one command as the second command, and transmitting the received packets to the at least one operating system to directly process the received packets using the second command setting information wherein the processor is further configured to convert the capability information to a format of a capability information matrix and the at least one command received from the external apparatus to a format of a capability vector, and determine whether the at least one command included in the received packet control information correspond to the first command or the second command based on the converted capability information and the converted at least one command.

9. The server apparatus of claim 8, wherein the processor is further configured to convert the at least one command corresponding to the first command to a command format compatible with the network interface apparatus, based on a result of the determination.

10. The server apparatus of claim 8, wherein the processor is further configured to analyze a category of a command performable by the network interface apparatus and inputs the at least one command corresponding to the first command to a table in the network interface apparatus, which corresponds to the category, based on a result of the analysis.

11. The server apparatus of claim 8, wherein the at least one command comprises a command related to at least one of switching, tagging, untagging, editing, filtering, and rate limiting.

12. The server apparatus of claim 8, wherein the at least one operating system comprises a software switch unit, the network interface apparatus comprises a hardware switch unit, and the processor controls the software switch unit and the hardware switch unit to perform virtual switching.

13. The server apparatus of claim 8, wherein the processor is further configured to request the external apparatus for the at least one command, wherein the processor does not request the external apparatus for the at least one command when a number of times the at least one command is requested is equal to or higher than a certain number of times.

14. A hypervisor configured to be installed within a virtual server that includes a network interface apparatus, the hypervisor comprising:

a processor configured to:

obtain capability information indicating which of virtual switching capabilities the network interface apparatus supports, determine a first command performable by the network interface apparatus and a second command not performable by the network interface apparatus based on the capability information, receive packet control information including at least one command from an external apparatus, determine whether the at least one command included in the received packet control information correspond to the first command or the second command based on identifying of which virtual switching capabilities the network interface apparatus supports using the capability information and the packet control information received, wherein the hypervisor is configured to:

provide first command setting information associated with the first command to control the network interface apparatus to perform virtual switching based on the first command when the determining by the processor determines that the first command is included in the at least one command received from the external apparatus and provide second command setting information associated with the second command to control at least one operating system to perform the virtual switching based on the second command when the determining by the processor determines that the at least one command does not include the first command but includes the second command, controlling processing of packets that are received according to the following:

when the processor determines that the first command is included in the at least one command, the processor is configured to control the network interface apparatus to process the received packets based on the first command using the first command setting information and transmit the processed packets to the at least one operating system, and when the processor determines that the at least one command does not include the first command, the processor is configured to recognize the at least one command as the second command, and transmit the received packets to the at least one operating system to directly process the received packets based on the second command using the second command setting information wherein the processor is further configured to convert the capability information to a format of a capability information matrix and the at least one command received from the external apparatus to a format of a capability vector, and determine whether the at least one command included in the received packet control information corresponds to the first command or the second command based on the converted capability information and the converted at least one command.

15. The hypervisor of claim 14, wherein the capability information comprises at least one of information about a virtual switching capability supported by the network interface apparatus and information about bit strings of a packet received by the network interface apparatus, which are checked before transmitting the packet to a destination.

* * * * *